United States Patent
Lefevre et al.

(10) Patent No.: US 10,523,400 B2
(45) Date of Patent: Dec. 31, 2019

(54) MULTI-CODE PROBABILISTIC SIGNAL SHAPING USING FREQUENCY-DIVISION MULTIPLEXING

(71) Applicant: Nokia Technologies Oy, Espoo OT (FI)

(72) Inventors: Yannick Lefevre, Kessel-Lo (BE); Jochen Maes, Antwerp (BE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/817,537

(22) Filed: Nov. 20, 2017

(65) Prior Publication Data
US 2019/0158238 A1    May 23, 2019

(51) Int. Cl.
| | |
|---|---|
| *H04L 12/26* | (2006.01) |
| *H04L 5/00* | (2006.01) |
| *H04J 1/12* | (2006.01) |
| *H04J 1/16* | (2006.01) |
| *H04L 1/00* | (2006.01) |
| *H04L 27/00* | (2006.01) |

(52) U.S. Cl.
CPC .......... *H04L 5/006* (2013.01); *H04J 1/12* (2013.01); *H04J 1/16* (2013.01); *H04L 1/0058* (2013.01); *H04L 1/0061* (2013.01); *H04L 27/0002* (2013.01)

(58) Field of Classification Search
CPC .......... H04L 47/22; H04L 47/25; H04L 47/38
USPC ............. 370/229, 230.1, 231, 465, 480, 482
See application file for complete search history.

(56) References Cited

U.S. PATENT DOCUMENTS

| | | | |
|---|---|---|---|
| 7,400,609 B2 | 7/2008 | Hammerschmidt | |
| 7,778,341 B2 | 8/2010 | Tong et al. | |
| 8,144,807 B2 | 3/2012 | Mirfakhraei et al. | |
| 8,363,749 B2 * | 1/2013 | Lee | H04L 1/0625 375/295 |
| 9,407,398 B2 | 8/2016 | Batshon et al. | |
| 9,673,907 B1 * | 6/2017 | Vassilieva | H04B 10/5161 |

(Continued)

FOREIGN PATENT DOCUMENTS

| | | |
|---|---|---|
| WO | WO2010005470 A2 | 1/2010 |
| WO | WO2010019168 A1 | 2/2010 |

OTHER PUBLICATIONS

Stojković, N. "ADSL analog front end." Automatika: časopis za automatiku, mjerenje, elektroniku, računarstvo i komunikacije 47.1-2 (2006): 59-67.

(Continued)

*Primary Examiner* — Dmitry Levitan
(74) *Attorney, Agent, or Firm* — Mendelsohn Dunleavy, P.C.; Yuri Gruzdkov

(57) ABSTRACT

An FDM communication system in which encoding/decoding settings for different sets of tones are specified using index values assigned to different sets of tones by selecting suitable respective values from a fixed set of index values. Each of the specified index values causes the corresponding digital signal processor to use a respective predefined pair of encoding or decoding settings that includes a respective predefined constellation and a respective predefined shaping code. In some embodiments, the used shaping codes are configured to operate as block codes, with the block sizes being selected such that a multi-code frame generated using multiple shaping codes can be matched to exactly one DMT symbol or to a desired number of whole DMT symbols.

26 Claims, 15 Drawing Sheets

(56) References Cited

U.S. PATENT DOCUMENTS

| | | | |
|---|---|---|---|
| 9,882,659 B2* | 1/2018 | Fine | H04B 14/02 |
| 9,893,919 B2* | 2/2018 | Kim | H04L 27/2082 |
| 9,929,813 B1* | 3/2018 | Batshon | H04B 10/516 |
| 10,091,046 B1* | 10/2018 | Lefevre | H04L 27/36 |
| 10,200,231 B1 | 2/2019 | Lefevre et al. | |
| 2005/0286620 A1 | 12/2005 | Peng | |
| 2009/0103646 A1 | 4/2009 | Dowling et al. | |
| 2009/0180495 A1 | 7/2009 | Li et al. | |
| 2016/0072659 A1 | 3/2016 | Stadelmeier et al. | |
| 2018/0026725 A1 | 1/2018 | Cho | |
| 2018/0083716 A1* | 3/2018 | Cho | H04B 7/0456 |
| 2018/0262274 A1* | 9/2018 | Yu | H04B 10/548 |
| 2018/0269979 A1* | 9/2018 | Zhang | H04B 10/5161 |
| 2019/0158238 A1 | 5/2019 | Lefevre et al. | |

OTHER PUBLICATIONS

Jones, E. "Introduction to DSL." Fundamentals of DSL technology (2006): 119.

Arafa, T., et al. "Performance of combined constellation shaping and bit interleaved coded modulation with iterative decoding (bicm-id)." Advances in Radio Science: ARS 9 (2011): 195.

Amjad, R. A., et al. "Fixed-to-variable length distribution matching." Information Theory Proceedings (ISIT), 2013 IEEE International Symposium on. IEEE, 2013.

Peng, L., et al. "On bit-loading for discrete multi-tone transmission over short range POF systems." Journal of lightwave technology 31.24 (2013): 4155-4165.

Böcherer, G., et al. "Bandwidth efficient and rate-matched low-density parity-check coded modulation." IEEE Transactions on Communications 63.12 (2015): 4651-4665.

Schulte, P., et al. "Constant composition distribution matching." IEEE Transactions on Information Theory 62.1 (2016): 430-434.

Pan, C., et al. "Probabilistic 16-QAM shaping in WDM systems." Journal of Lightwave Technology 34.18 (2016): 4285-4292.

Fehenberger, T., et al. "On probabilistic shaping of quadrature amplitude modulation for the nonlinear fiber channel." Journal of Lightwave Technology 34.21 (2016): 5063-5073.

Idler, W., et al. "Field Trial of a 1 Tb/s Super-Channel Network Using Probabilistically Shaped Constellations." Journal of Lightwave Technology 35.8 (2017): 1399-1406.

Cho, J., et al. "Trans-Atlantic field trial using probabilistically shaped 64-QAM at high spectral efficiencies and single-carrier real-time 250-Gb/s16-QAM," Optical Fiber Communication Conference. Optical Society of America, 2017.

Böcherer, G., et al. "High Throughput Probabilistic Shaping with Product Distribution Matching." arXiv preprint arXiv:1702.07510 (2017).

Che, Di et al., "Entropy-loading: multi-carrier constellation-shaping for colored-SNR optical channels." 2017 Optical Fiber Communications Conference and Exhibition (OFC). IEEE, 2017.

Chen, X. et al., "Single-Wavelength, Single-Polarization, Single-Photodiode Kramers-Kronig Detection of 440-Gb/s Entropy-Loaded Discrete Multitone Modulation Transmitted over 100-km SSMF", 2017 IEEE Photonics Conference (IPC) Part II. IEEE, 2017.

Wyglinski, Alexander M., and Di Pu. Digital communication systems engineering with software-defined radio. Artech House, 2013. pp. 187-187.

International Search Report and Written Opinion for International Patent Application No. PCT/EP2018/081490; dated Mar. 19, 2019.

Futurewei Technologies, "G.fast: Performance of LDPC Coded Modulation," ITU-T Q4/15 Contribution 2017-02-Q4-034, Feb. 2017.

Nokia Corporation, "G.mgfast: Probabilistic amplitude shaping (PAS) for G.mgfast" ITU-T Q4/15 Contribution T17-SG15RGM-Q4-171127-C-0025, Nov. 2017.

Marvell Semiconductors, "Evolution of G.hn: Agreement to support the generic Multi Level Coding scheme," ITU-T Q18/15 Contribution 2017-01-Q18-023, Jan. 2017.

Forney, G. D. "Trellis shaping." IEEE Transactions on Information Theory 38.2 (1992): 281-300.

Peng, Linning, Maryline Hélard, and Sylvain Haese. "On bit-loading for discrete multi-tone transmission over short range POF systems." Journal of lightwave technology 31.24 (2013): 4155-4165.

Wei, D., "G.mgfast: Constellation Shaping on LDPC Coded Modulation," Study Group 15, International Telecommunication Union, Telecommunication Standardization Sector, Sep. 2017, pp. 1-6.

Eleftheriou, Evangelos, and S. Olcer. "Low-density parity-check codes for digital subscriber lines." Communications, 2002. ICC 2002. IEEE International Conference on. vol. 3. IEEE, 2002.

Fehenberger, Tobias, et al. "LDPC coded modulation with probabilistic shaping for optical fiber systems." Optical Fiber Communication Conference. Optical Society of America, 2015, 3 pages.

Steiner, Fabian, and Patrick Schulte. "Design of robust, protograph based LDPC codes for Rate-Adaptation via probabilistic shaping." Turbo Codes and Iterative Information Processing (ISTC), 2016 9th International Symposium on. IEEE, 2016, pp. 5 pages.

* cited by examiner

| SMI | SIGNAL 446 | SIGNAL 444 | SIGNAL 442 |
|---|---|---|---|
| 1 | $C_1$ | $DM_1$ | $P_1$ |
| ⋮ | ⋮ | ⋮ | ⋮ |
| j | $C_j$ | $DM_j$ | $P_j$ |
| ⋮ | ⋮ | ⋮ | ⋮ |
| J | $C_J$ | $DM_J$ | $P_J$ |

600

800

1000

1100

1202

| BIT-WORD | CODEWORD |
|---|---|
| 0 | 111 |
| 100 | 113 |
| 101 | 131 |
| 1110 | 133 |
| 110 | 311 |
| 11110 | 313 |
| 111110 | 331 |
| 111111 | 333 |

1204

| BIT-WORD | CODEWORD |
|---|---|
| 000 | 111 |
| 001 | 113 |
| 010 | 131 |
| 011 | 133 |
| 100 | 311 |
| 101 | 313 |
| 110 | 331 |
| 111 | 333 |

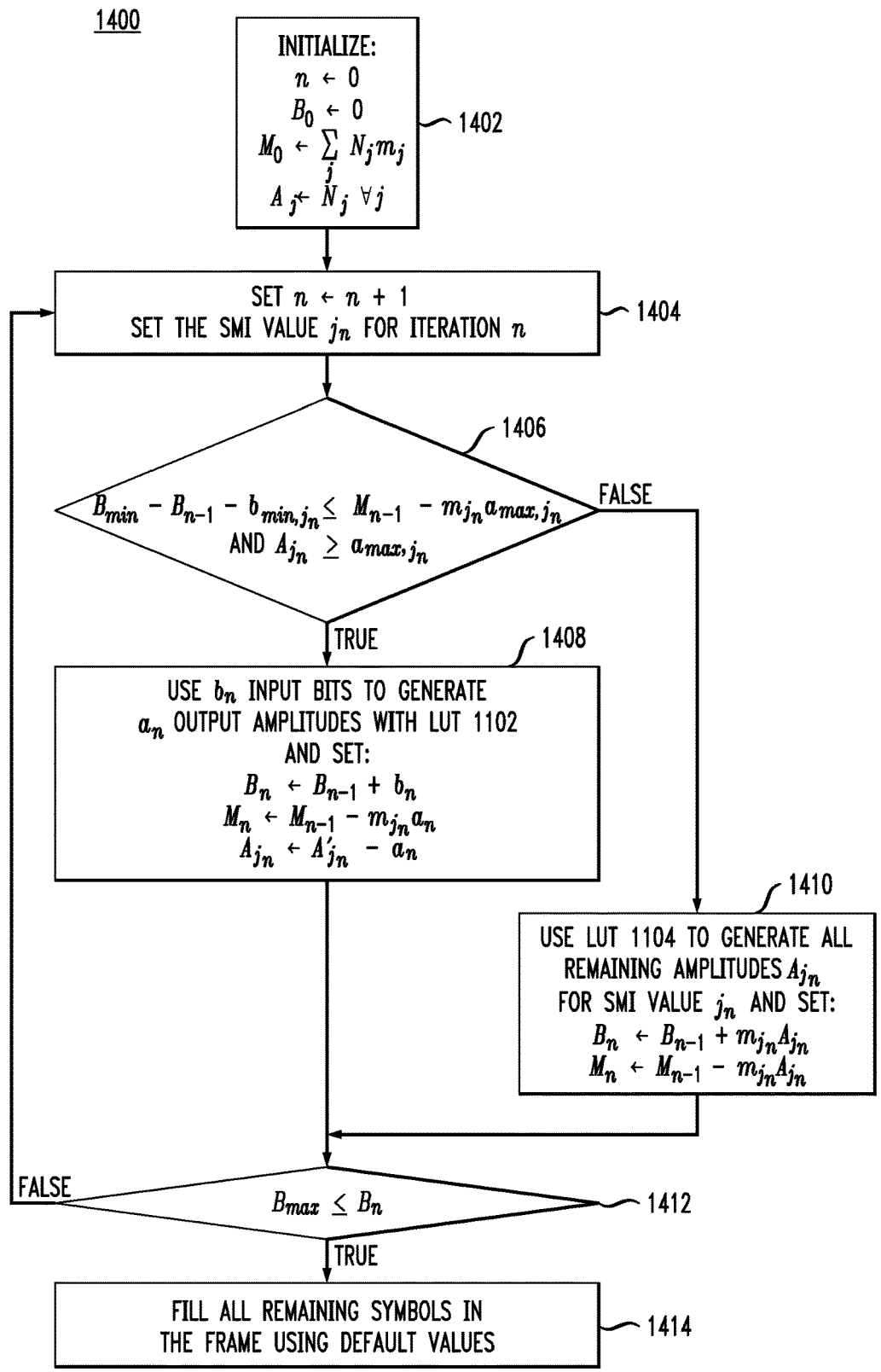

MULTI-CODE PROBABILISTIC SIGNAL SHAPING USING FREQUENCY-DIVISION MULTIPLEXING

BACKGROUND

Field

The present disclosure relates to communication equipment and, more specifically but not exclusively, to methods and apparatus for transmitting and receiving communication signals using probabilistic signal shaping and frequency-division multiplexing.

Description of the Related Art

This section introduces aspects that may help facilitate a better understanding of the disclosure. Accordingly, the statements of this section are to be read in this light and are not to be understood as admissions about what is in the prior art or what is not in the prior art.

Signal shaping can provide energy savings, transmission-distance increases, and/or bit-error-rate reductions often referred to as the shaping gain. In a typical implementation of signal shaping, constellation symbols of relatively large energy are transmitted less frequently than constellation symbols of relatively small energy. For a linear communication channel, the shaping gain can theoretically approach 1.53 dB.

Frequency-division multiplexing (FDM) is a method of transmitting data on multiple carrier frequencies that can be used in wireline, wireless, and optical communication channels. Different variants of FDM are used in various forms of wideband digital communications, digital television, audio broadcasting, digital subscriber line (DSL) or G.fast Internet access, local area networks (LANs), home networks, 4G mobile-access networks, etc. Some variants of FDM, typically collectively referred to as discrete multi-tone (DMT) modulation, are used in wireline communication channels established over, e.g., plain old telephone service (POTS) copper wiring, coaxial cable, and/or power lines. Some FDM schemes use orthogonal frequency-division multiplexing (OFDM).

At least some FDM (e.g., DSL and/or G.fast) systems can benefit from the use of signal shaping.

SUMMARY OF SOME SPECIFIC EMBODIMENTS

Disclosed herein are various embodiments of an FDM communication system in which encoding/decoding settings for different sets of tones are specified using index values assigned to different sets of tones by selecting suitable respective values from a fixed set of index values. Each of the specified index values causes the corresponding digital signal processor to use a respective predefined pair of encoding or decoding settings that includes a respective predefined constellation and a respective predefined shaping code. In some embodiments, the used shaping codes are configured to operate as block codes, with the block sizes being selected such that a multi-code frame generated using multiple shaping codes can be matched to exactly one DMT symbol or to a desired number of whole DMT symbols.

According to one embodiment, provided is an apparatus comprising a data transmitter that comprises an electrical analog front end, a digital signal processor, and an electronic controller, the electronic controller being configured to: interpret an index value assigned to a set of tones configurable to carry data and generate one or more corresponding control signals such that, in response to the one or more control signals, the digital signal processor is configured to use, for each of such index values, a respective predefined pair of settings, the predefined pair including a respective predefined constellation and a respective predefined shaping code; and generate the one or more corresponding control signals in response to a control message having specified therein two or more different index values, each of the two or more different index values being assigned to a respective different set of tones; and wherein the digital signal processor is configured to drive the analog front end to cause a modulated electrical signal generated by the analog front end to carry the data.

According to another embodiment, provided is an apparatus comprising a data receiver that comprises an electrical analog front end, a digital signal processor, and an electronic controller, the digital signal processor being configured to process a stream of values representing an electrical signal outputted by the electrical analogue front end in response to a received input signal having a plurality of modulated carriers, the electronic controller being configured to: interpret an index value assigned to a set of tones configurable to carry data and generate one or more corresponding control signals such that, in response to the one or more control signals, the digital signal processor is configured to use, for each of such index values, a respective predefined pair of settings, the predefined pair including a respective predefined constellation and a respective predefined shaping code; and generate the one or more corresponding control signals in response to a configuration setting having specified therein two or more different index values, each of the two or more different index values being assigned to a respective different set of tones; and wherein the digital signal processor is configured to process the stream of values to recover source data carried by the plurality of modulated carriers.

According to yet another embodiment, provided is a communication method comprising the steps of: configuring an electronic controller to interpret an index value assigned to a set of tones configurable to carry data such that, for each of such index values, the electronic controller causes digital signal processing corresponding to the set of tones to use a respective predefined pair of settings, the predefined pair including a respective predefined constellation and a respective predefined shaping code; and communicating to the electronic controller two or more different index values, each of the two or more different index values being assigned to a respective different set of tones.

According to yet another embodiment, provided is an apparatus comprising a data transmitter that comprises an electrical analog front end, a digital signal processor, and an electronic controller, wherein the digital signal processor is configured to run a plurality of shaping codes, each of the shaping codes being configured to generate amplitudes of constellation symbols of a respective constellation; wherein the electronic controller is configured to cause the digital signal processor to run each of the shaping codes as a block code, each of the block codes being configured to convert a respective block of source bits into a respective block of amplitudes, the respective block of amplitudes having a respective fixed number of amplitudes; wherein the respective fixed number of amplitudes is selected to be an integer multiple of a respective number of tones in a respective set of tones modulated using the respective constellation; wherein a sum of the respective numbers of tones is equal to a number of tones available to carry the source bits in one DMT symbol; and wherein the digital signal processor is configured to drive the analog front end to cause a modulated electrical signal generated by the analog front end to carry the constellation symbols.

According to yet another embodiment, provided is an apparatus comprising a data receiver that comprises an electrical analog front end, a digital signal processor, and an electronic controller, wherein the digital signal processor is configured to: process a stream of values representing an electrical signal outputted by the electrical analogue front end in response to a received input signal having a plurality of modulated carriers; and run a plurality of shaping codes, each of the shaping codes being configured to handle amplitudes of constellation symbols of a respective constellation; wherein the electronic controller is configured to cause the digital signal processor to run each of the shaping codes as a block code, each of the block codes being configured to convert a respective block of amplitudes into a respective block of source bits, the respective block of amplitudes having a respective fixed number of amplitudes; wherein the respective fixed number of amplitudes is an integer multiple of a respective number of tones in a respective set of tones modulated using the respective constellation; wherein a sum of the respective numbers of tones is equal to a number of tones configured to carry the source bits in one DMT symbol; and wherein the digital signal processor is configured to process the stream of values to recover the source bits carried by the plurality of modulated carriers.

According to yet another embodiment, provided is a communication method comprising the steps of: configuring a digital signal processor to run a plurality of shaping codes, each of the shaping codes being configured to handle (e.g., generate or decode) amplitudes of constellation symbols of a respective constellation; and configuring an electronic controller to cause the digital signal processor to run each of the shaping codes as a block code, each of the block codes being configured to interconvert a respective block of source bits and a respective block of amplitudes, the respective block of amplitudes having a respective fixed number of amplitudes; wherein the respective fixed number of amplitudes is selected to be an integer multiple of a respective number of tones in a respective set of tones modulated using the respective constellation; and wherein a sum of the respective numbers of tones is equal to a number of tones available to carry the source bits in one DMT symbol.

BRIEF DESCRIPTION OF THE DRAWINGS

Other aspects, features, and benefits of various disclosed embodiments will become more fully apparent, by way of example, from the following detailed description and the accompanying drawings, in which:

FIG. 5 shows a look-up table (LUT) that can be used in the digital circuit of FIG. 4 according to an embodiment;

FIG. 14 shows a flowchart of a control method that can be implemented in the digital circuit of FIG. 11A according to an embodiment;

DETAILED DESCRIPTION

Figure 1:
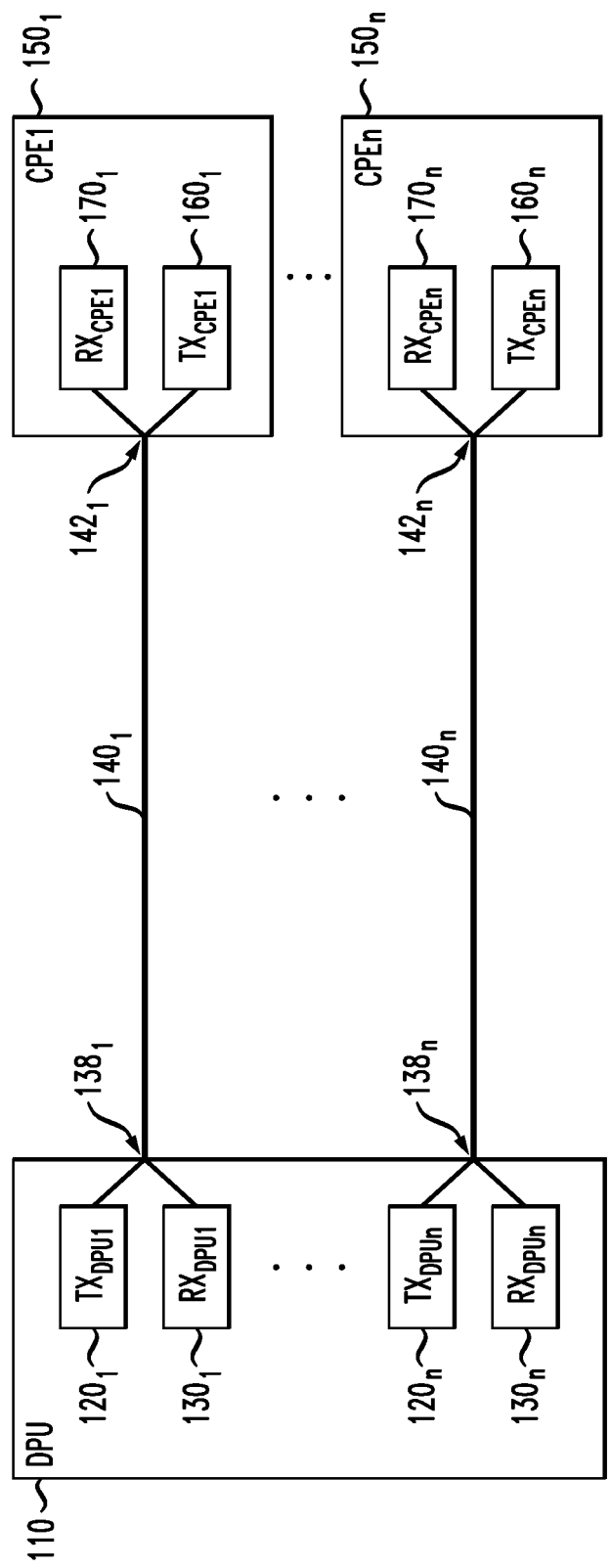
FIG. 1 shows a block diagram of a DMT system in which various embodiments can be practiced.

Some embodiments disclosed herein may benefit from the use of at least some features disclosed in U.S. Pat. No. 10,091,046, which is incorporated herein by reference in its entirety.

The following acronyms/abbreviations are used in the description of various embodiments and/or in the accompanying drawings:
ADC Analog-to-Digital Converter;
AFE Analog Front End;
AWGN Additive White Gaussian Noise;
BPSK Binary Phase Shift Keying;
CPE Customer Premise Equipment;
CRC Cyclic Redundancy Check;
DAC Digital-to-Analog Converter;
DMT Discrete Multi-Tone;
DMUX Demultiplexer;
DPU Distribution Point Unit;
DSP Digital Signal Processor;
DSL Digital Subscriber Line;
DTU Data Transfer Unit;
FDM Frequency-Division Multiplexing;
FEC Forward Error Correction;
FFT Fast Fourier Transform;
FIFO Fixed-In/Fixed-Out;
FIVO Fixed-In/Variable-Out;
IFFT Inverse Fast Fourier Transform;
IQ In-phase/Quadrature;
I/O Input/Output;
LAN Local Area Network;
LDPC Low Density Parity Check;
LLR Log-Likelihood Ratio;
LSB Least-Significant Bit;

LUT Look-Up Table;
MC Multi-Code;
MSB Most-Significant Bit;
MUX Multiplexer;
OFDM Orthogonal Frequency-Division Multiplexing;
PAM Pulse Amplitude Modulation;
POTS Plain Old Telephone Service;
QAM Quadrature Amplitude Modulation;
QPSK Quadrature Phase Shift Keying;
RF Radio Frequency;
RMC Robust Management Channel;
SC Single Code;
SMI Shaped Modulation Index;
SNR Signal-to-Noise Ratio;
VIFO Variable-In/Fixed-Out; and
VIVO Variable-In/Variable-Out.

There are two general types of signal shaping that are referred to as geometric and probabilistic, respectively. Geometric shaping can be implemented to optimize the location of constellation points (symbols) on the complex plane for a fixed (but not necessarily uniform) symbol probability. Probabilistic shaping can be implemented to optimize the probability of constellation symbols that are located on a fixed (but not necessarily uniform) grid on the complex plane. Although both types of signal shaping can theoretically be implemented to achieve the shaping gain of up to 1.53 dB for an additive-white-Gaussian-noise (AWGN) channel, probabilistic shaping offers several important advantages over geometric shaping. These advantages include but are not limited to compatibility with conventional (e.g., available off-the-shelf) constellations and forward-error-correction (FEC) codes.

Examples of joint use of probabilistic signal shaping and FEC coding are described, e.g., in the above-cited U.S. Pat. No. 10,091,046.

An important benefit of probabilistic shaping is that the amount of shaping (e.g., specific characteristics of the corresponding shaping code) can be selected to optimize a desired set of performance characteristics of any given channel. For example, depending on specified performance requirements, adjustable probabilistic shaping with an adjustable symbol rate can be used to achieve an optimal (e.g., the highest) spectral efficiency for the given relatively short transmission distance or an optimal (e.g., the highest) net bit-rate for the given relatively long transmission distance.

We have recognized that a full realization of this and/or other potential benefits of multi-code probabilistic shaping entails significant modifications of conventional FDM (e.g., DSL or G.fast) communication protocols. For example, the data-coding settings that specify, inter alia, the used shaping code(s) selected from a plurality of available shaping codes need to be communicated between the corresponding FDM transmitter and receiver in an efficient manner. In addition, a frame structure that is compatible with multi-code probabilistic shaping needs to be used, e.g., to inhibit possible error propagation.

At least some of the above-indicated problems are addressed by various embodiments in which data-encoding/data-decoding settings for different sets of tones are communicated between the transmitter and receiver using index values assigned to different sets of tones by selecting suitable (e.g., optimal) respective values from a fixed set of index values. Each of the specified index values causes the corresponding digital signal processor (DSP) to use a respective predefined pair of data-encoding or data-decoding settings that includes a respective predefined constellation and a respective predefined shaping code. In some embodiments, the used shaping codes are configured to operate as block codes, with the block sizes being selected such that a multi-code (MC) frame is matched to exactly one DMT symbol or to any integer number of whole DMT symbols.

Some embodiments lend themselves to operating procedures in which allocation of shaping codes, constellations, FEC codes, and/or symbol rates to different groups of tones can be carried out with any desired spectral granularity. In some such embodiments, the spectral granularity can be such that the data-encoding settings corresponding to a single individual tone are separately selected and then shared by the corresponding FDM transmitter and receiver.

FIG. 1 shows a block diagram of a DMT system 100 in which various embodiments can be practiced. System 100 comprises a distribution point unit (DPU) 110 and a plurality of customer-premise-equipment (CPE) units $150_1$-$150_n$ connected by way of subscriber lines $140_1$-$140_n$ as indicated in FIG. 1. In some embodiments, DPU 110 may be located at a "central office" of the service provider (e.g., a telephone company). In some other embodiments, DPU 110 may be remotely deployed using one or more backhaul (e.g., optical) links to a location that is closer to the subscriber premises than that of the central office, and the corresponding equipment can be physically placed in a street cabinet, on a pole, in the basement of a building, etc. CPE units $150_1$-$150_n$ are typically located at different respective customer sites.

Each of subscriber lines $140_1$-$140_n$ typically comprises a respective "twisted-pair" (or other suitable) cable configured to transmit signals corresponding to voice and/or data services. At DPU 110, each of subscriber lines $140_1$-$140_n$ is connected to a respective one of input/output (I/O) ports $138_1$-$138_n$. At the CPE side, each of subscriber lines $140_1$-$140_n$ is similarly connected to a respective one of I/O ports $142_1$-$142_n$, each being an I/O port of a respective one of CPE units $150_1$-$150_n$.

In an example embodiment, DPU 110 comprises a plurality of transceivers ($120_i$/$130_i$), each internally connected to a respective one of I/O ports $138_1$-$138_n$, where i=1, 2, . . . , n. A transceiver ($120_i$/$130_i$) includes a respective transmitter $120_i$ and a respective receiver $13_i$. A CPE unit $150_i$ comprises a transceiver ($160_i$/$170_i$) internally connected to I/O port $142_i$ of that CPE unit. A transceiver ($160_i$/$170_i$) includes a respective transmitter $160_i$ and a respective receiver $170_i$. Transmitter $160_i$ can be functionally similar to transmitter $120_i$. Receiver $170_i$ can be functionally similar to receiver $130_i$. Example embodiments of transmitters 120, 160 are described in more detail below in reference to FIGS. 2, 4, 8, and 11. Example embodiments of receivers 130, 170 are described in more detail below in reference to FIGS. 3, 6, 10, and 15.

Figure 2:
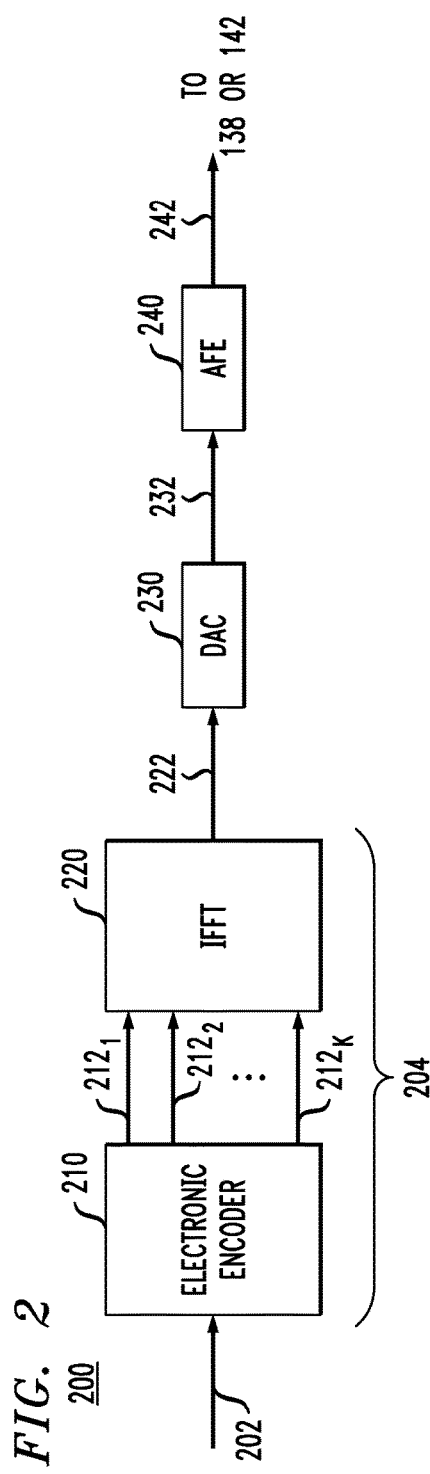
FIG. 2 shows a block diagram of a transmitter that can be used in the DMT system of FIG. 1 according to an embodiment.

FIG. 2 shows a block diagram of a transmitter 200 that can be used in system 100 (FIG. 1) according to an embodiment. Transmitter 200 comprises a digital signal processor (DSP) 204, a digital-to-analog converter (DAC) 230, and an analog front end (AFE) 240. Different instances of transmitter 200 can be used to implement some or all of transmitters $120_1$-$120_n$ and/or $160_1$-$160_n$ (FIG. 1).

DSP 204 operates to carry out data encoding and digital carrier multiplexing to generate a digital output signal 222 having encoded thereon an input data stream 202. DAC 230 operates to convert digital signal 222 into an analog form to generate a corresponding analog electrical signal 232. AFE 240 then converts signal 232 into a form suitable for transmission over a subscriber line 140 and applies a resulting modulated electrical signal 242 to a corresponding I/O port 138 or 142.

In an example embodiment, DSP 204 comprises an electronic encoder 210 and an inverse fast-Fourier-transform (IFFT) module 220. Electronic encoder 210 carries out data encoding that includes, inter alia, probabilistic signal shaping, FEC encoding, and constellation and carrier mapping to generate constellation-symbol sequences $212_1$-$212_K$, each carrying constellation symbols intended for transmission using a different respective tone (carrier wave) of a different respective frequency. IFFT module 220 then uses an inverse Fourier transform, as known in the pertinent art, to perform digital carrier multiplexing, thereby converting sequences $212_1$-$212_K$ into a corresponding time-domain digital signal 222. Depending on the specific embodiment, the number K of tones used in transmitter 200 can be on the order of one hundred, one thousand, or even greater than one thousand.

Example embodiments of electronic encoder 210 are described in more detail below in reference to FIGS. 4, 8, and 11.

AFE 240 can be a conventional transmitter AFE circuit. Example transmitter AFE circuits suitable for implementing AFE 240 are briefly reviewed, e.g., by N. Stojkovic in "ADSL Analog Front End," AUTOMATIKA v. 47 (2006), no. 1-2, pp. 59-67, which is incorporated herein by reference in its entirety.

Figure 3:
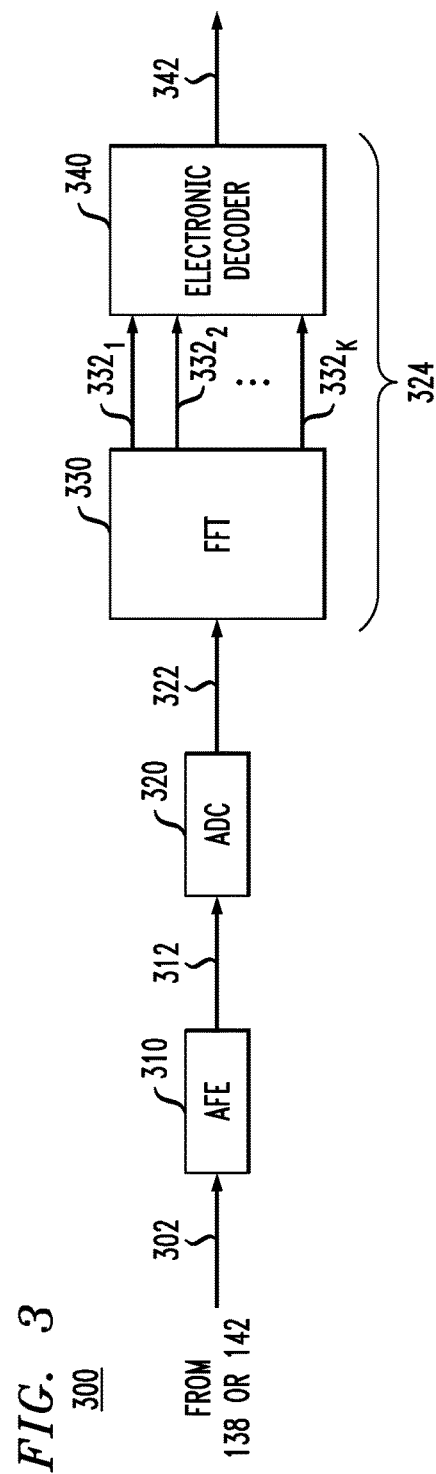
FIG. 3 shows a block diagram of a receiver that can be used in the DMT system of FIG. 1 according to an embodiment.

FIG. 3 shows a block diagram of a receiver 300 that can be used in system 100 (FIG. 1) according to an embodiment. Receiver 300 comprises an AFE 310, an analog-to-digital converter (ADC) 320, and a DSP 324. Different instances of receiver 300 can be used to implement some or all of receivers $130_1$-$130_n$ and/or $170_1$-$170_n$ (FIG. 1).

AFE 310 operates to convert a modulated electrical input signal 302 received through a corresponding I/O port 138 or 142 into a corresponding analog electrical RF signal 312 suitable for digitization in ADC 320. The typical analog signal processing applied to input signal 302 in AFE 310 includes amplification and filtering. Example receiver AFE circuits suitable for implementing AFE 310 are briefly reviewed, e.g., in the above-cited paper by N. Stojkovic. In some embodiments, an AFE 310 and an AFE 240 belonging to the same transceiver or modem can share some circuit elements, such as a clocking system and an electrical hybrid.

ADC 320 operates to sample signal 312 at an appropriate sampling rate to generate a corresponding sequence 322 of digital samples (values).

In an example embodiment, DSP 324 comprises a fast-Fourier-transform (FFT) module 330 and an electronic decoder 340. FFT module 330 uses a Fourier transform, as known in the pertinent art, to perform digital carrier de-multiplexing, thereby converting sequence 322 into the corresponding frequency-domain digital sequences $332_1$-$332_K$. Electronic decoder 340 then applies constellation and carrier demapping, error correction, and redundancy decoding to recover the data stream 202 encoded by the corresponding transmitter onto the output signal 242 that caused receiver 300 to receive input signal 302 (also see FIG. 2). The recovered data stream 202 is then directed to external circuits by way of a digital output signal 342.

Example embodiments of electronic decoder 340 are described in more detail below in reference to FIGS. 6, 10, and 15.

Figure 4:
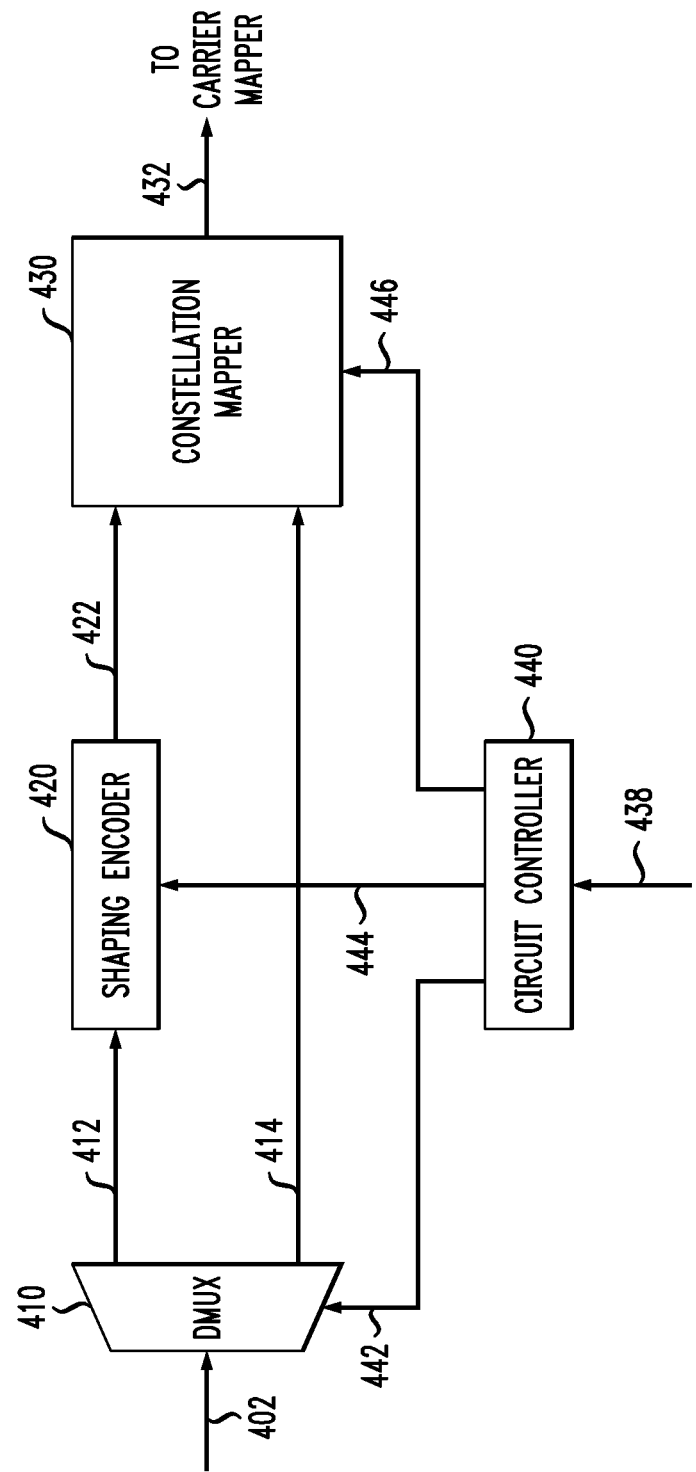
FIG. 4 shows a block diagram of a digital circuit that can be used in the transmitter of FIG. 2 according to an embodiment.

FIG. 4 shows a block diagram of a digital circuit 400 that can be used in transmitter 200 (FIG. 2) according to an embodiment. More specifically, circuit 400 can be a part of electronic encoder 210. In some embodiments, electronic encoder 210 includes two or more instances (nominal copies) of circuit 400 connected in parallel with one another.

In some embodiments, circuit 400 can be modified to include an FEC encoder. Several schemes that can be used to incorporate an FEC encoder into circuit 400 are described, e.g., in the above-cited U.S. Pat. No. 10,091,046. Additional schemes that can be used to incorporate an FEC encoder into circuit 400 are described, e.g., in the paper by Georg Bocherer, Fabian Steiner, and Patrick Schulte, entitled "High Throughput Probabilistic Shaping with Product Distribution Matching," which is incorporated herein by reference in its entirety.

Circuit 400 comprises a demultiplexer (DMUX) 410, a shaping encoder (distribution matcher) 420, and a constellation mapper 430, the operative configurations of which are controlled using control signals 442, 444, and 446, respectively, generated by a circuit controller 440 in response to receiving a control signal 438 from an external (e.g., system-configuration) controller. In an example embodiment, control signal 438 provides one or more values of the shaped-modulation index (SMI), which is described in more detail below, e.g., in reference to FIG. 5. Based on the received SMI value(s), circuit controller 440 generates control signals 442, 444, and 446.

DMUX 410 operates to partition an input data stream 402 to generate data streams 412 and 414. Data stream 412 is applied to shaping encoder 420. Data stream 414 is applied to constellation mapper 420. The relative bit rates of data streams 412 and 414 are determined by control signal 442.

Input data stream 402 may be configured to carry data transfer units (DTUs), each of which is a structured data block intended for transmission and, if necessary, retransmission as a whole unit. A typical DTU includes a DTU header, a payload portion, and a cyclic-redundancy-check (CRC) portion. In some embodiments, data stream 402 may not carry an entire DTU. For example, if multiple parallel circuits 400 are used, then each circuit 400 may be configured to process a respective part of a DTU, with different parts of the same DTU being processed by different respective instances of circuit 400. A person of ordinary skill in the art will readily understand how to generate input data stream 402 using input data stream 202 (FIG. 2).

Shaping encoder 420 is configured to carry out probabilistic signal shaping under which an input block of source bits provided by data stream 412 is converted into a set of bit-words of an output sequence 422, each bit-word being a binary label of a corresponding amplitude of a symbol constellation. Typically, the statistical properties of data stream 412 are similar to those of a random or pseudo-random data sequence. However, different bit-word values in output sequence 422 have different respective rates of occurrence dictated by the operative shaping code(s) used by shaping encoder 420. The rate of occurrence generally decreases with an increase of the amplitude. In some embodiments, shaping encoder 420 can select the operative shaping code from an available plurality of different shaping codes in response to control signal 444. The different shaping codes available to shaping encoder 420 for selection in response to control signal 444 may differ from one another in one or more of the following characteristics: (i) the length of individual bit-words generated for output sequence 422; (ii) respective distributions of the shaped amplitudes represented by the bit-words of output sequence 422; and (iii) the code entropy.

Example shaping codes of different bit-word/codeword lengths that can be used in shaping encoder 420 in the above-indicated manner are the prefix-free codes disclosed in U.S. patent application Ser. No. 15/374,397, which is incorporated herein by reference in its entirety. These codes are "prefix-free" in the sense that no codeword of the shaping code is a prefix of another codeword. With such codes, the number of generated amplitudes can be deterministic, which enables an operating mode in which the amplitudes for different tones (e.g., different frequency components of signal 242, FIG. 2) are generated in a fixed sequential order.

Some examples of amplitude distributions that can be produced by different shaping codes include, but are not limited to an exponential distribution, a Gaussian distribution, and a Maxwell-Boltzmann distribution.

The term "code entropy" is used herein to refer to the average ratio between the number of bits supplied by the input data stream and the number of bit-words in the corresponding output sequence generated by the shaping code. Depending on the code, the non-averaged ratio may or may not be a function of time. For example, for a fixed-in/fixed-out (FIFO) code, the non-averaged ratio remains constant and does not depend on the size or binary contents of the input data stream. Different FIFO codes may have different code rates and, as such, result in different respective fixed ratios for the resulting input/output blocks. There are three other code types that are often referred-to in the relevant literature as variable-in/fixed-out (VIFO), fixed-in/variable-out (FIVO), and variable-in/variable-out (VIVO) codes, respectively. For the latter codes, either the size of the input data block or the size of the output block, or both, may depend on the binary contents of the input data block, which causes the above-mentioned non-averaged ratio to be a function of time.

Constellation mapper 430 uses an operative constellation to convert sequence 422 and data stream 414 into output stream 432. In an example embodiment, constellation mapper 430 can select the operative constellation from an available plurality of different constellations in response to control signal 446. The different constellations available to constellation mapper 430 for selection in response to control signal 446 may differ from one another in size (e.g., modulation order), type (e.g., PAM or QAM), binary labels assigned to constellation points, and/or geometric arrangement (e.g., rectangular, cross, or star) of constellation points on the complex plane. In operation, constellation mapper 430 uses (i) a bit-word of sequence 422 to select a corresponding amplitude or amplitude pair and (ii) one or two bits concurrently provided by data stream 414 to determine the sign bit value(s) assigned to the selected amplitude(s), thereby generating a corresponding constellation symbol for sequence 432.

Controller 440 operates to generate control signals 442, 444, and 446 such that the resulting configurations and operations of DMUX 410, shaping encoder 420, and constellation mapper 430 are compatible with each other.

For example, control signals 444 and 446 operate to cause the selected shaping code used in shaping encoder 420 and the selected constellation used in constellation mapper 430 to correspond to the same modulation order and employ the same set of binary labels for the shaped amplitudes and the corresponding constellation points. If the selected constellation is a $2^m$-PAM constellation, then control signals 442 and 444 also cause (i) each bit-word of sequence 422 to have a length of (m−1) bits and (ii) the bit rate of data stream 414 to be such that this data stream provides one bit for each bit-word of sequence 422. In this configuration, each constellation symbol of sequence 432 encodes m bits. The (m−1) bits provided by the corresponding bit-word of sequence 422 determine the amplitude of the constellation symbol, and the corresponding bit provided by data stream 414 determines the sign of the constellation symbol.

As already indicated above, controller 440 generates each of control signals 442, 444, and 446 based on the same corresponding SMI value from the set of SMI values specified by control signal 438. Therefore, if a different SMI value is selected, then controller 440 generates a new set of control signals 442, 444, and 446 to ensure continued compatibility of the processing implemented in DMUX 410, shaping encoder 420, and constellation mapper 430.

FIG. 5 shows an example look-up table (LUT) 500 that can be used in controller 440 according to an embodiment. The first column of LUT 500 lists J possible values of the SMI, which are arranged in the consecutive order from one to J, where J is a positive integer. For each SMI value j listed in the first column, LUT 500 specifies three parameters: (i) the corresponding constellation $C_j$; (ii) the corresponding shaping code $DM_j$; and (iii) the corresponding partition coefficient $P_j$, where j=1, ..., J. In an example embodiment, the SMI values and the corresponding parameters are such that a higher SMI value generally corresponds to a higher information rate. The SMI value of zero (SMI=0) may be reserved for the tones that are not modulated and, as such, do not carry any payload data, e.g., due to an unacceptably low SNR.

For two different SMI values $j_1$ and $j_2$ ($j_1 \neq j_2$) listed in LUT 500, the corresponding constellations $C_{j1}$ and $C_{j2}$ may be the same (i.e., $C_{j1}=C_{j2}$) or different (i.e., $C_{j1} \neq C_{j2}$). If $C_{j1}=C_{j2}$, then the corresponding shaping codes $DM_{j1}$ and $DM_{j2}$ are different (i.e., $DM_{j1} \neq DM_{j2}$). If $C_{j1} \neq C_{j2}$, then the corresponding shaping codes $DM_{j1}$ and $DM_{j2}$ are typically different (i.e., $DM_{j1} \neq DM_{j2}$), but in some embodiments of LUT 500 the same shaping code (i.e., $DM_{j1}=DM_{j2}$) may be listed as long as that code is compatible with each of the constellations $C_{j1}$ and $C_{j2}$. In other words, for any particular SMI value, the corresponding combination of the constellation and shaping code listed in LUT 500 is unique to that particular SMI value, and no other SMI value in LUT 500 has the exact same combination of the shaping code and constellation as that particular SMI value.

The partition coefficient $P_j$ is not an independent parameter, and its value is unequivocally determined by the relevant properties of constellation $C_j$ and shaping code $DM_j$ listed in the corresponding row of LUT 500. In an example embodiment, the partition coefficient $P_j$ may be specified in the form of a ratio $p_j/q_j$, where $p_j$ and $q_j$ are positive integers. In some embodiments, LUT 500 does not list the partition coefficient $P_j$, and the corresponding controller is configured to calculate it on the fly based on the specified constellation $C_j$ and shaping code $DM_j$.

In operation, in response to a specific SMI value j provided by way of control signal 438, controller 440 reads the parameters from the corresponding row of LUT 500 and generates control signals 442, 444, and 446 accordingly. More specifically, control signal 442 may configure DMUX 410 to direct $q_j$ bits to data stream 414 for every $p_j$ bits directed to data stream 412. Control signal 444 configures shaping encoder 420 to generate sequence 422 using shaping code $DM_j$. Control signal 446 configures constellation mapper 430 to generate sequence 432 using constellation $C_j$.

Figure 6:
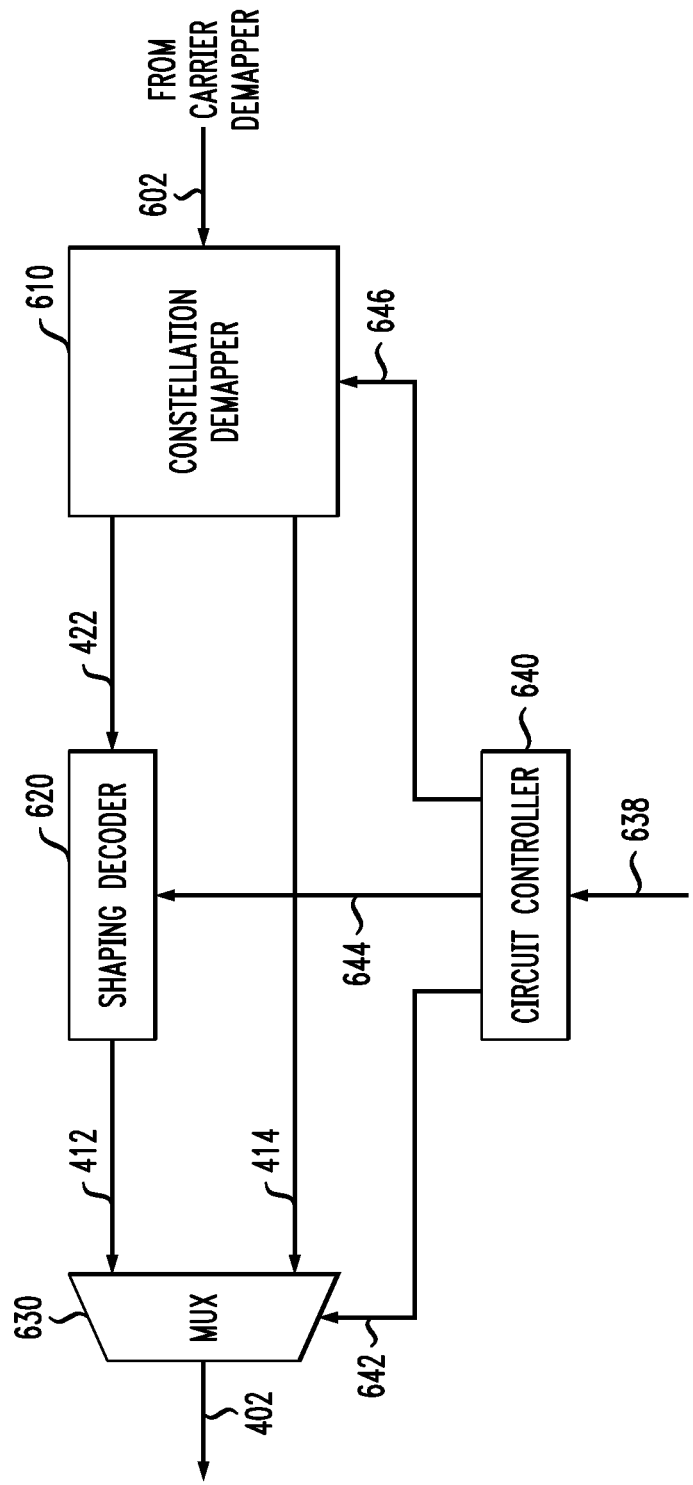
FIG. 6 shows a block diagram of a digital circuit that can be used in the receiver of FIG. 3 according to an embodiment.

FIG. 6 shows a block diagram of a digital circuit 600 that can be used in receiver 300 (FIG. 3) according to an embodiment. More specifically, circuit 600 can be a part of electronic decoder 340. In some embodiments, electronic decoder 340 may include two or more instances (nominal copies) of circuit 600 connected in parallel with one another.

In some embodiments, circuit 600 can be modified to include an FEC decoder. Several schemes that can be used to incorporate an FEC decoder into circuit 600 are described, e.g., in the above-cited U.S. Pat. No. 10,091,046. Additional schemes that can be used to incorporate an FEC decoder into circuit 600 are described, e.g., in the above-cited paper by Georg Bocherer, Fabian Steiner, and Patrick Schulte.

Circuit 600 operates to recover data stream 402 (also see FIG. 4) in response to receiving a corresponding input stream 602 of digital samples (values) from a carrier demapper of electronic decoder 340. In an example embodiment, the carrier demapper generates input stream 602 by appropriately transferring thereto digital samples from one or more sequences $332_1$-$332_K$ generated by FFT module 330 of the corresponding receiver 300, e.g., as described above in reference to FIG. 3.

Circuit 600 comprises a constellation demapper 610, a shaping decoder 620, and a multiplexer (MUX) 630, the operative configurations of which are controlled using control signals 646, 644, and 642, respectively, generated by a circuit controller 640 in response to receiving a control signal 638 from an external (e.g., system-configuration) controller. In an example embodiment, control signal 638 can be similar to control signal 438 (FIG. 4) and be configured to provide one or more SMI values. Based on the received SMI value(s), circuit controller 630 generates control signals 642, 644, and 646.

Constellation demapper 610 uses an operative constellation to reconstruct sequence 422 and data stream 414 based on the digital samples provided by input stream 602 (also see FIG. 4). In an example embodiment, constellation demapper 610 can select the operative constellation from an available plurality of different constellations in response to control signal 646. The different constellations from which constellation demapper 610 can select the operative constellation are typically the same as those available to constellation mapper 430 (FIG. 4).

Shaping decoder 620 uses an operative shaping code to convert sequence 422 back into data stream 412. In an example embodiment, shaping decoder 620 can select the operative shaping code from an available plurality of different shaping codes in response to control signal 644. The different shaping codes from which shaping encoder 620 can select the operative shaping code are typically the same as those available to shaping encoder 420 (FIG. 4).

MUX 630 operates to properly multiplex the reconstructed data streams 412 and 414 to recover data stream 402. The manner in which MUX 630 multiplexes data streams 412 and 414 is determined by control signal 642.

Controller 640 operates to generate control signals 642, 644, and 646 such that the resulting configurations of constellation demapper 610, shaping decoder 620, and MUX 630 are compatible with each other, and the corresponding operations performed therein are inverse to those performed in the digital circuit 400 that caused digital circuit 600 to receive input stream 602. In an example embodiment, controller 640 may generate control signals 642, 644, and 646 using a LUT analogous to LUT 500 (FIG. 5).

Figure 7:
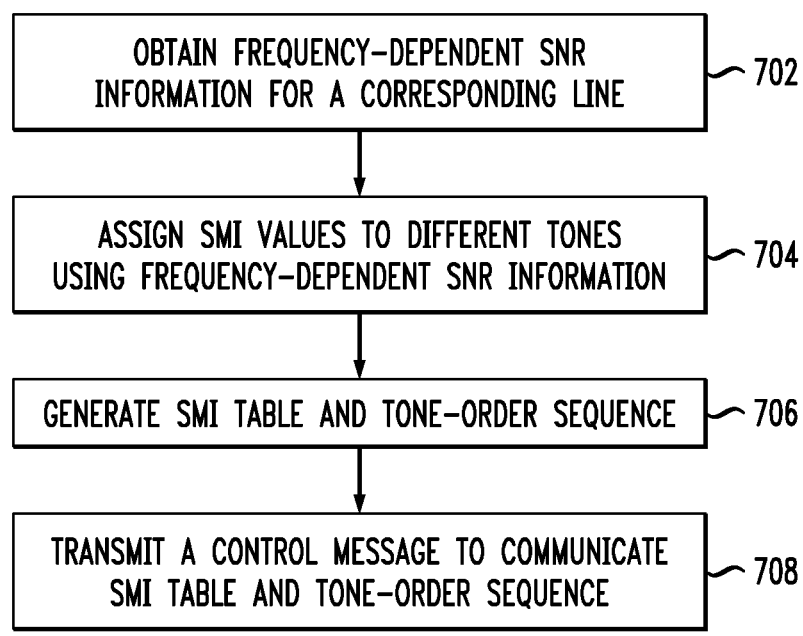
FIG. 7 shows a flowchart of a control method that can be used in the DMT system of FIG. 1 according to an embodiment.

FIG. 7 shows a flowchart of a control method 700 that can be used in system 100 (FIG. 1) according to an embodiment. More specifically, method 700 can be used to generate one or more control signals 438 for one or more instances of circuit 400 and/or one or more control signals 638 for one or more instances of circuit 600.

At step 702 of method 700, a system-configuration controller (or other pertinent entity in system 100) obtains frequency-dependent SNR information for a corresponding line 140. The obtained SNR information may include, e.g., results of a prior frequency-dependent SNR measurement performed at receiver 300 and communicated to the system-configuration controller and/or transmitter 200, e.g., via a control channel. In some embodiments, such other pertinent entity may be receiver 300 itself, in which case the SNR information may not need to be communicated out.

At step 704, receiver 300 or the system-configuration controller uses the SNR information obtained at step 702 to assign respective SMI values to different tones used for data transmission on the particular line 140. For example, one possible SMI-assignment procedure may rely on a set of SNR threshold values. In this case, if the SNR value falls between the first and second SNR threshold values for a particular tone or set of tones, then the system-configuration controller assigns to that particular tone or set of tones the SMI value of one. If the SNR value falls between the second and third SNR threshold values for a particular tone or set of tones, then the system-configuration controller assigns to that particular tone or set of tones the SMI value of two, and so on. Other suitable SMI-assignment procedures can alternatively be used as well.

The set of SNR threshold values used at step 704 can be selected, e.g., using suitable optimization procedures directed at determining different configurations (each including a respective shaping code and a respective constellation) that can provide good (e.g., acceptable or optimal) performance under different SNR conditions. For example, the shaping codes and constellations for different SMI values can be selected such that the corresponding operating points cover a target SNR range in a desired way (e.g., with uniform spacing). The corresponding design and optimization procedures can be carried out prior to the deployment of system 100 in the field, e.g., at the design and/or production stage of the relevant system components. In some alternative embodiments, the SNR threshold values can be computed on the fly, after the deployment.

At step 706, the system-configuration controller compiles an SMI table that specifies the SMI values assigned to different tones and/or sets of tones at step 704. In an example embodiment, the SMI table can have two columns, wherein: (i) the first column lists, e.g., in the ascending order all of the SMI values assigned at step 704; and (ii) for each SMI value of the first column, the corresponding entry in the second column lists all tones to which that particular SMI value was assigned at step 704. In this case, the second column of the SMI table defines the groups of tones, each group containing the tones with the same respective SMI value. In mathematical terms, each of such groups G can be defined as follows:

$$G_l = \{k_i | \text{SMI}_i = l\} \quad (1)$$

where $k_i$ is the tone index. Depending on the conditions, the compiled SMI table may consist of as few as a single row (thereby defining a single group G) or as many as J different rows (thereby defining J different groups G), where J is the maximum SMI value (also see FIG. 5).

In addition to the SMI table, the system-configuration controller may also generate a tone-order sequence that specifies the order in which the QAM (or PAM) constellation symbols for the different tones are to be generated by the transmitter and processed by the receiver. In an example embodiment, the tone-order sequence can be in the following form:

$$k_1, k_2, \ldots, k_K \quad (2)$$

where $k_1$ is the tone index of the first tone to be generated/processed; $k_2$ is the tone index of the second tone to be generated/processed, and so on.

In some embodiments, the SMI table and the tone-order sequence can be used to generate an ordered SMI sequence. In an example embodiment, the ordered SMI sequence can be in the following form:

$$j_1, j_2, \ldots j_K \qquad (3)$$

where $j_1$ is the SMI value of the first tone to be generated/processed; $j_2$ is the SMI value of the second tone to be generated/processed, and so on.

At step 708, the system-configuration controller transmits, e.g., over a control channel, a control message that can be used to communicate some or all of the tables and sequences generated at step 706 to the corresponding circuit controllers 440 (FIG. 4) and/or 640 (FIG. 6). In some embodiments, the control message can be in the form of control signals 438 (FIG. 4) and 638 (FIG. 6). In some other embodiments, the control message can be communicated by the system-configuration controller to different respective control circuits that can then generate control signals 438 (FIG. 4) and 638 (FIG. 6) in response to the received control message. As already indicated above, circuit controllers 440 (FIG. 4) and 640 (FIG. 6) can generate control signals 442, 444, and 446 and control signals 642, 644, and 646, respectively, e.g., using a corresponding LUT, such as LUT 500 (FIG. 5).

In some embodiments, the tone-order sequence may be a predetermined sequence known a priori to the transmitter and the receiver. In this case, the tone-order sequence does not need to be transmitted at step 708.

In some embodiments, the ordered SMI sequence can be generated at the transmitter and/or the receiver using the tone-order sequence and the received SMI table.

A person of ordinary skill in the art will understand that method 700 can be repeated as appropriate or necessary to maintain a good working configuration of system 100 that is suitable for use under the existing channel conditions on different lines 140. In different embodiments, different suitable control mechanisms and/or channels can be used for communicating the control message of step 708 to the appropriate entities of system 100. Depending on the particular embodiment and the physical location of the system-configuration controller, the control message of step 708 may need to be transmitted only to transmitter 200, only to receiver 300, or to both transmitter 200 and receiver 300. In some embodiments, the control message of step 708 may need to be transmitted to some additional and/or alternative destinations within system 100 besides transmitter 200 and/or receiver 300.

Figure 8:
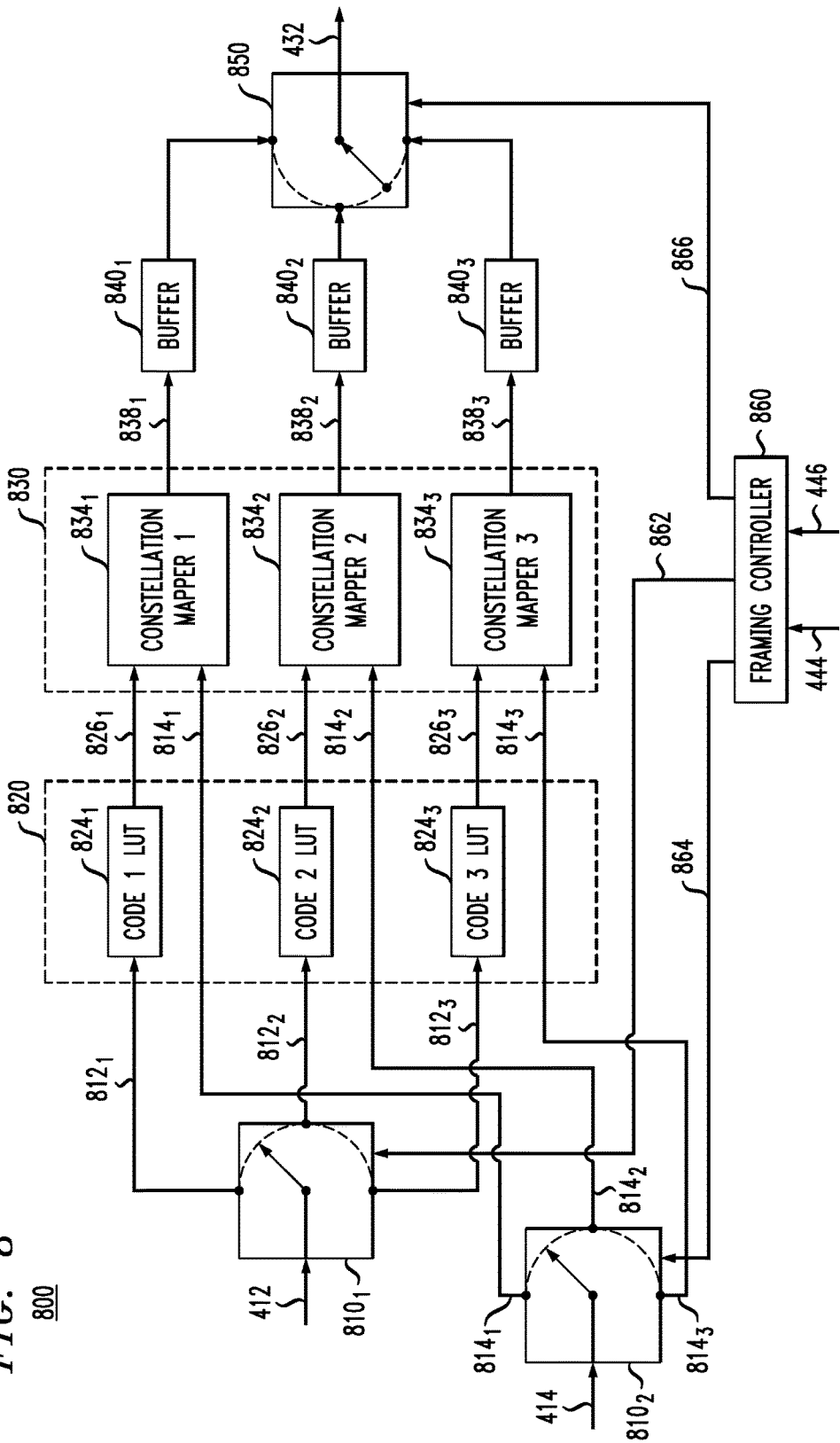
FIG. 8 shows a block diagram of a digital circuit that can be used in the digital circuit of FIG. 4 according to an embodiment.

FIG. 8 shows a block diagram of a digital circuit 800 that can be used to implement a part of digital circuit 400 (FIG. 4) according to an embodiment. Circuit 800 includes a framing controller 860 that enables the amplitudes generated by different shaping codes to be organized into multi-code (MC) frames of a fixed size, with the fixed size being such that each MC frame can be transmitted using a fixed integer number of DMT symbols. In some embodiments, this fixed number can be one (i.e., each MC frame is matched to exactly one DMT symbol; also see FIG. 9).

As used herein, the term "DMT symbol" refers to a time-dependent portion of signal 222 (FIG. 2) generated using a set of constellation symbols provided by sequences $212_1$-$212_K$ in the same single signaling interval (time slot), with the duration of the signaling interval being such that it can accommodate a single (e.g., QAM or PAM) constellation symbol per tone.

For illustration purposes, FIG. 8 shows a circuit layout for an embodiment in which a shaping encoder 820 used therein can use three different shaping codes (e.g., $DM_1$, $DM_2$, and $DM_3$; also see FIG. 5), each implemented using a respective one of LUT circuits $824_1$-$824_3$. The outputs of LUT circuits $824_1$-$824_3$ are connected to modules $834_1$-$834_3$, respectively, of a constellation mapper 830, wherein each of the modules is configured to use a respective one of constellations $C_1$, $C_2$, and $C_3$ (also see FIG. 5). Based on the provided description, a person of ordinary skill in the art will understand how to make and use an embodiment of circuit 800 that employs any desired number, e.g., up to J of shaping codes $DM_1$-$DM_J$ and up to J of constellations $C_1$-$C_J$ (also see FIG. 5). In some embodiments, some or all of the corresponding LUT circuits 824 can be implemented using some of the LUT circuits disclosed in the above-cited U.S. patent application Ser. No. 15/374,397. Additional embodiments of LUT circuits 824 are described in more detail below in reference to FIG. 11.

In some embodiments, circuit 800 can be modified such that the ordered SMI sequence (see Eq. (3)) is used to control switches $810_1$, $810_2$, and 850, in which case these switches are switched synchronously so that they send/receive signals to/from the same processing branch of circuit 800, in the order specified by the ordered SMI sequence. The tone-order sequence (see Eq. (2)) is then used to map the constellation points of stream 432 onto different carriers and appropriately direct them towards the respective sequences $212_1$-$212_K$. In such embodiments, buffers 840 can be removed.

The operation of circuit 800 is described in more detail below in reference to FIG. 9 and in continued reference to FIG. 8.

Figure 9:
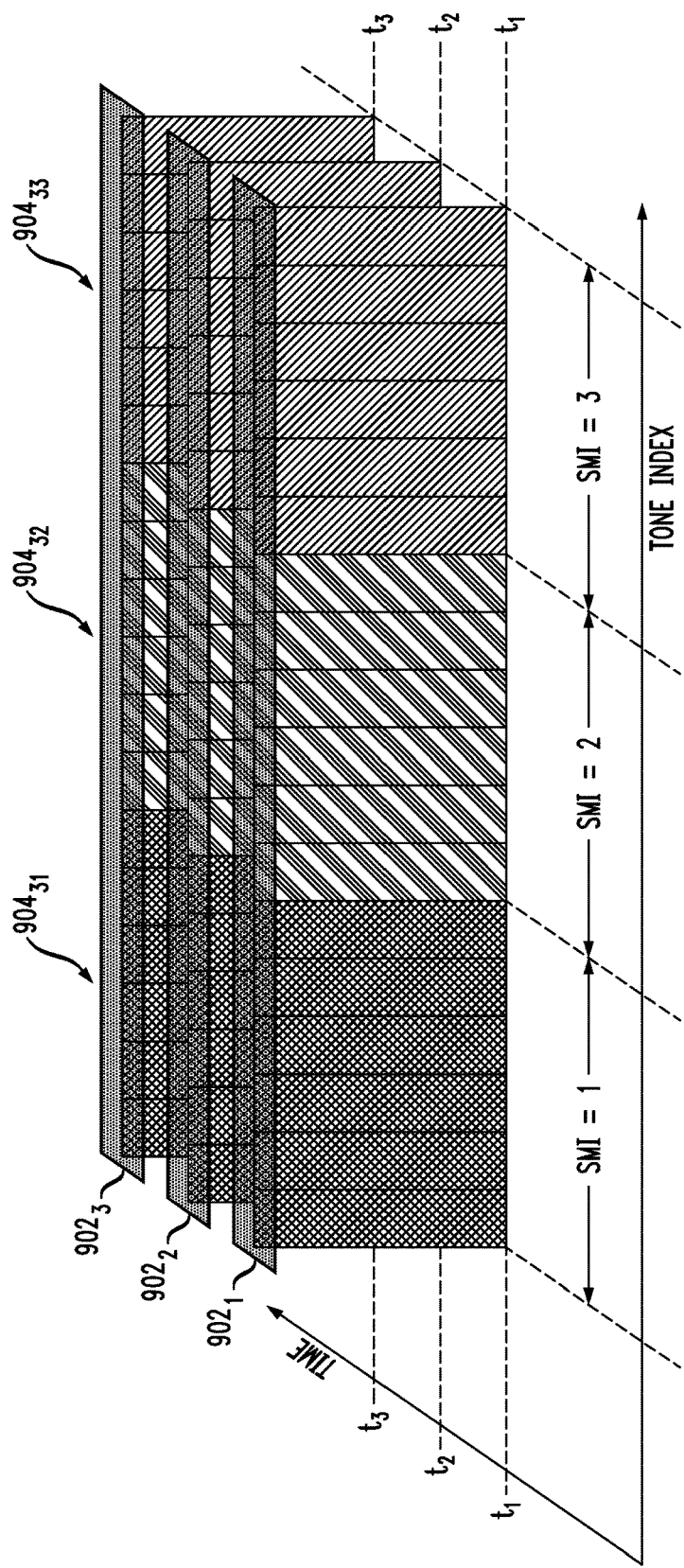
FIG. 9 graphically illustrates an example structure of a multi-code (MC) frame that can be generated using the digital circuit of FIG. 8.

FIG. 9 graphically illustrates an example MC frame structure that can be generated using circuit 800. More specifically, FIG. 9 shows three MC frames $902_1$-$902_3$, with each of the MC frames being matched to exactly one DMT symbol transmitted in the corresponding one of the time slots labeled $t_1$, $t_2$, and $t_3$. Different MC frames 902 are independent of each other and can be generated autonomously at the transmitter and decoded in parallel at the receiver.

An MC frame 902 carries a fixed total number of amplitudes and can contain amplitudes generated using different shaping codes corresponding to different respective SMI values. In the shown example, each of MC frames $902_1$-$902_3$ carries amplitudes generated by the shaping codes corresponding to three different SMI values, illustratively SMI=1, 2, 3. A person of ordinary skill in the art will understand that, in an alternative embodiment, each of MC frames 902 can similarly be generated to carry amplitudes generated by the shaping codes corresponding to a different (from three) number of SMI values. Depending on the particular conditions of the corresponding line 140, the tones corresponding to the same SMI value may occupy a respective continuous spectral interval (as illustratively shown in FIG. 9) or be interspersed with some tones corresponding to one or more other SMI values.

As shown, an MC frame 902 comprises three single-code (SC) sub-frames, each configured to carry a respective fixed number of amplitudes for each of the three different SMI values. For example, MC frame $902_3$ comprises SC sub-frames $904_{31}$, $904_{32}$, and $904_{33}$. Each of MC frames $902_1$ and $902_2$ similarly comprises three respective (unlabeled) SC sub-frames 904 that are analogous to SC sub-frames $904_{31}$, $904_{32}$, and $904_{33}$.

If the corresponding constellations are QAM constellations, then each tone can carry two amplitudes per time slot (signaling interval), one amplitude corresponding to the I component of the QAM constellation symbol, and the other amplitude corresponding to the Q component of the QAM constellation symbol. If the total number of tones used for payload transmission is K, then each MC frame 902 carries 2K payload amplitudes, among which: (i) $2K_1$ amplitudes correspond to SMI=1 and are carried by the SC sub-frame 904 corresponding to that SMI value; (ii) $2K_2$ amplitudes correspond to SMI=2 and are carried by the SC sub-frame 904 corresponding to that SMI value; and (iii) $2K_3$ amplitudes correspond to SMI=3 and are carried by the SC sub-frame 904 corresponding to that SMI value, where $K_1+K_2+K_3=K$. Here, $K_1$ is the cardinality of the group $G_1$; $K_2$ is the cardinality of the group $G_2$; and $K_3$ is the cardinality of the group $G_3$ (see Eq. (1)). The amplitudes for an MC frame 902 can be generated sequentially at the transmitter, and then decoded sequentially at the receiver, e.g., as further described below in reference to FIG. 8.

Referring back to FIG. 8, circuit 800 can be used to generate an MC frame 902, for example, as follows. In response to control signals 444 and 446 (also see FIG. 4), framing controller 860 generates control signals 862, 864, and 866 for switches $810_1$, $810_2$, and 850, respectively, such that circuit 800 generates: (i) $2K_1$ amplitudes corresponding to SMI=1; (ii) $2K_2$ amplitudes corresponding to SMI=2; and (iii) $2K_3$ amplitudes corresponding to SMI=3, where $K_1+K_2+K_3=K$. These 2K amplitudes are then directed, by way of sequence 432, to the carrier mapper where they are appropriately used to generate the portion (time slice) of constellation-symbol sequences $212_1$-$212_K$ (see FIG. 2) corresponding to MC frame 902.

Control signals 862 and 864 cause switches $810_1$ and $810_2$ to go through three different configurations. In some embodiments, the three configurations can be instantiated consecutively, with each of the configurations lasting for a corresponding continuous time interval of an appropriate duration. In some other embodiments switches $810_1$ and $810_2$ can be toggled through the different configurations, e.g., in a cyclic manner, several times until all of the needed source bits are supplied to LUT circuits $824_1$-$824_3$.

In the first configuration, control signal 862 causes switch $810_1$ to connect its input terminal at reference numeral 412 to an output terminal $812_1$. The (cumulative) duration of the connection is such that output terminal $812_1$ receives the number of source bits from data sequence 412 that is needed for LUT circuit $824_1$ executing shaping code $DM_1$ to generate $2K_1$ amplitudes $826_1$ for constellation-mapper module $834_1$. The needed number of source bits depends on the particulars of shaping code $DM_1$ and, for some (e.g., VIFO) codes, on the binary contents of the corresponding portion of data sequence 412.

Control signal 864 causes switch $810_2$ to connect its input terminal at reference numeral 414 to an output terminal $814_1$. The (cumulative) duration of the connection is such that output terminal $814_1$ receives $2K_1$ bits from data sequence 414, which are directed to constellation-mapper module $834_1$.

In response to the $2K_1$ amplitudes $826_1$ and $2K_1$ bits from terminal $814_1$, constellation-mapper module $834_1$ generates $K_1$ QAM symbols $838_1$. As already indicated above, each of the QAM symbols is generated using two respective amplitudes $826_1$ and two respective bits from terminal $814_1$, with the latter two bits being used as sign bits. The $K_1$ QAM symbols $838_1$ are temporarily stored in a buffer $840_1$.

In the second configuration, control signal 862 causes switch $810_1$ to connect its input terminal at reference numeral 412 to an output terminal $812_2$. The (cumulative) duration of the connection is such that output terminal $812_2$ receives the number of source bits from data sequence 412 that is needed for LUT circuit $824_2$ executing shaping code $DM_2$ to generate $2K_2$ amplitudes $826_2$ for constellation-mapper module $834_2$. The needed number of source bits depends on the particulars of shaping code $DM_2$ and, for some codes, on the binary contents of the corresponding portion of data sequence 412.

Control signal 864 causes switch $810_2$ to connect its input terminal at reference numeral 414 to an output terminal $814_2$. The (cumulative) duration of the connection is such that output terminal $814_2$ receives $2K_2$ bits from data sequence 414, which are directed to constellation-mapper module $834_2$.

In response to the $2K_2$ amplitudes $826_2$ and $2K_2$ bits from terminal $814_2$, constellation-mapper module $834_2$ generates $K_2$ QAM symbols $838_2$. Each of the QAM symbols is generated using two respective amplitudes $826_2$ and two respective sign bits from terminal $814_2$. The $K_2$ QAM symbols $838_2$ are temporarily stored in a buffer $840_2$.

In the third configuration, control signal 862 causes switch $810_1$ to connect its input terminal at reference numeral 412 to an output terminal $812_3$. The (cumulative) duration of the connection is such that output terminal $812_3$ receives the number of source bits from data sequence 412 that is needed for LUT circuit $824_3$ executing shaping code $DM_3$ to generate $2K_3$ amplitudes $826_3$ for constellation-mapper module $834_3$. The needed number of source bits depends on the particulars of shaping code $DM_3$ and, for some codes, on the binary contents of the corresponding portion of data sequence 412.

Control signal 864 causes switch $810_2$ to connect its input terminal at reference numeral 414 to an output terminal $814_3$. The (cumulative) duration of the connection is such that output terminal $814_3$ receives $2K_3$ bits from data sequence 414, which are directed to constellation-mapper module $834_3$.

In response to the $2K_3$ amplitudes $826_3$ and $2K_3$ bits from terminal $814_3$, constellation-mapper module $834_3$ generates $K_3$ QAM symbols $838_3$. Each of the QAM symbols is generated using two respective amplitudes $826_3$ and two respective sign bits from terminal $814_3$. The $K_3$ QAM symbols $838_3$ are temporarily stored in a buffer $840_3$.

Control signal 866 is used to implement a read-out of the QAM symbols $838_1$, $838_2$, and $838_3$ from buffers $840_1$, $840_2$, and $840_3$, respectively, for sequence 432. The read-out can be implemented by reading out the QAM symbols $838_1$, $838_2$, and $838_3$ in any desired order. For example, in some configurations, buffers $840_1$, $840_2$, and $840_3$ can be emptied out consecutively. In some other configurations, the QAM symbols $838_1$, $838_2$, and $838_3$ can be read out such that their order in sequence 432 corresponds to the order in which the QAM symbols are applied to constellation-symbol sequences $212_1$-$212_K$ (FIG. 2), e.g., in accordance with the frequency structure of different respective SC sub-frames 904. In still some other configurations, the QAM symbols $838_1$, $838_2$, and $838_3$ can be read out in accordance with the tone-order sequence (Eq. (2)).

Figure 10:
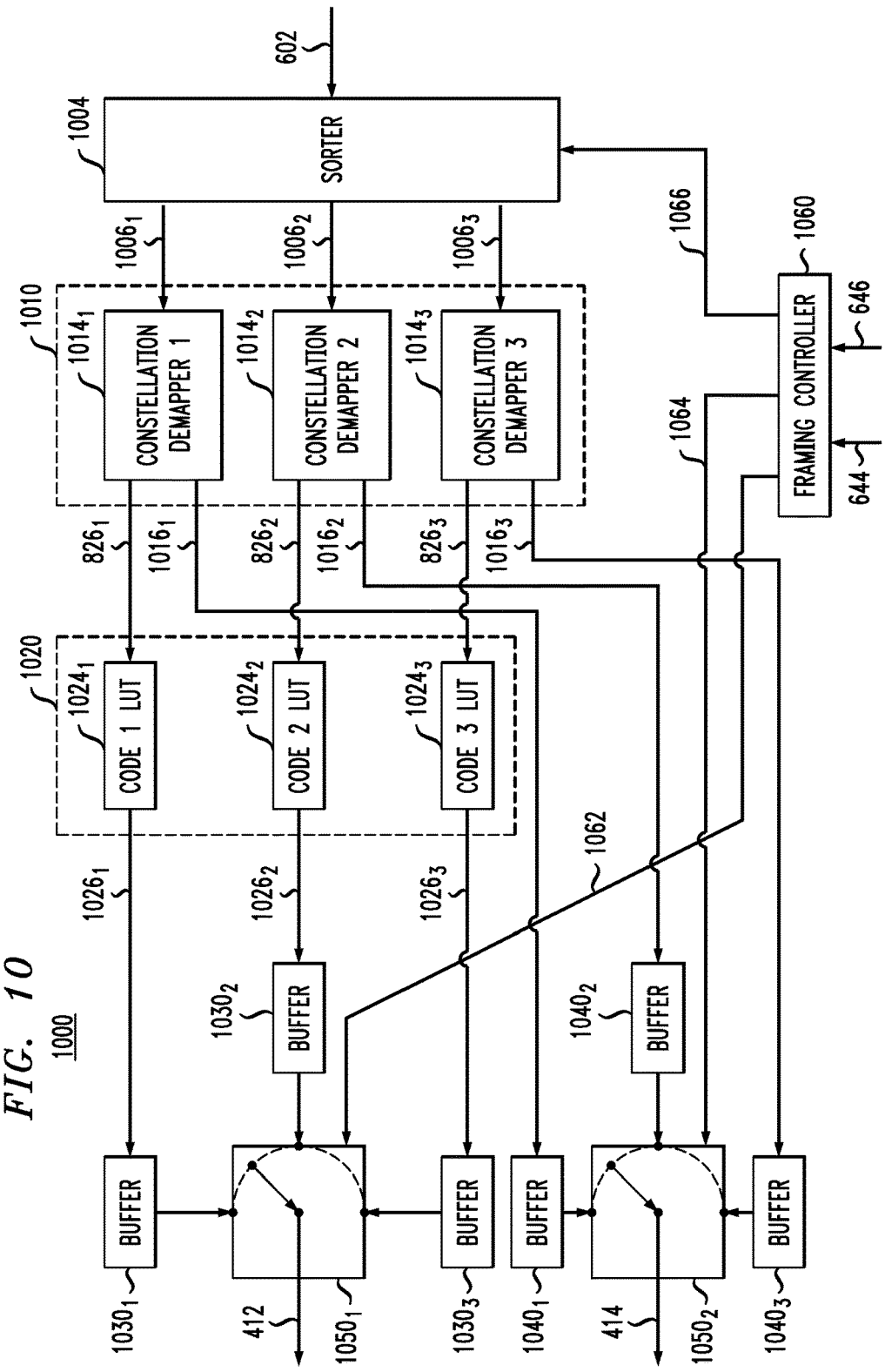
FIG. 10 shows a block diagram of a digital circuit that can be used in the digital circuit of FIG. 6 according to an embodiment.

FIG. 10 shows a block diagram of a digital circuit 1000 that can be used to implement a part of digital circuit 600 (FIG. 6) according to an embodiment. Circuit 1000 operates to recover data streams 412 and 414 in response to input stream 602 of digital samples (values) received from the carrier demapper of electronic decoder 340 (also see FIGS. 3 and 6). A framing controller 1060 enables circuit 1000 to apply different shaping codes and constellations to different sets of digital samples representing SC sub-frames 904 of MC frames 902 (FIG. 9) such that the corresponding portions of data streams 412 and 414 can be properly recovered. A person of ordinary skill in the art will understand that the processing implemented in circuit 1000 is complementary to the processing implemented in circuit 800.

In some embodiments, circuit 1000 can be modified such that the ordered SMI sequence (see Eq. (3)) is used to control a switch $1050_1$, a switch $1050_2$, and a sorter 1004, in which case these circuits are switched synchronously so that they send/receive signals to/from the same processing branch of circuit 1000, in the order specified by the ordered SMI sequence. In such embodiments, buffers 1030 and 1040 can be removed.

As shown in FIG. 10, circuit 1000 includes a constellation demapper 1010 and a shaping decoder 1020. Constellation demapper 1010 includes modules $1014_1$-$1014_3$ configured to use constellations $C_1$, $C_2$, and $C_3$, respectively (also see FIG. 5). Shaping decoder 1020 includes LUT circuits $1024_1$-$1024_3$ configured to use shaping codes $DM_1$, $DM_2$, and $DM_3$, respectively (also see FIG. 5). Based on the provided description, a person of ordinary skill in the art will understand how to make and use an embodiment of circuit 1000 that employs any desired number, e.g., up to J of shaping codes $DM_1$-$DM_J$ and up to J of constellations $C_1$-$C_J$ (also see FIG. 5). In some embodiments, some or all of the corresponding LUT circuits 1024 can be implemented using some of the LUT circuits disclosed in the above-cited U.S. patent application Ser. No. 15/374,397. Additional embodiments of LUT circuits 1024 are described in more detail below in reference to FIGS. 15A-15B.

In response to control signals 644 and 646 (also see FIG. 6), framing controller 1060 generates control signals 1062, 1064, and 1066 for a switch $1050_1$, a switch $1050_2$, and a sorter 1004, respectively. It should be noted that control signals 1062, 1064, and 1066 are generated in the manner consistent with that of control signals 862, 864, and 866 (FIG. 8) to ensure mutual compatibility of the processing implemented in circuits 800 and 1000.

Control signal 1066 causes sorter 1004 to sort digital samples of input stream 602 such that: (i) digital samples $1006_1$ corresponding to SMI=1 are directed to constellation-demapper module $1014_1$; (ii) digital samples $1006_2$ corresponding to SMI=2 are directed to constellation-demapper module $1014_2$; and (iii) digital samples $1006_3$ corresponding to SMI=3 are directed to constellation-demapper module $1014_3$.

Constellation-demapper module $1014_1$ uses constellation $C_1$ and digital samples $1006_1$ to recover $2K_1$ amplitudes $826_1$ and the corresponding $2K_1$ sign bits $1016_1$ (also see FIG. 8). Constellation-demapper module $1014_2$ similarly uses constellation $C_2$ and digital samples $1006_2$ to recover $2K_2$ amplitudes $826_2$ and the corresponding $2K_2$ sign bits $1016_2$ (also see FIG. 8). Constellation-demapper module $1014_3$ similarly uses constellation $C_3$ and digital samples $1006_3$ to recover $2K_3$ amplitudes $826_3$ and the corresponding $2K_3$ sign bits $1016_2$ (also see FIG. 8).

LUT circuit $1024_1$ operates to apply an inverse operation to that applied by LUT circuit $824_1$, thereby converting the $2K_1$ amplitudes $826_1$ received from constellation-demapper module $1014_1$ back into a corresponding source-bit sequence $1026_1$. LUT circuit $1024_2$ similarly operates to apply an inverse operation to that applied by LUT circuit $824_2$, thereby converting the $2K_2$ amplitudes $826_2$ received from constellation-demapper module $1014_2$ back into a corresponding source-bit sequence $1026_2$. LUT circuit $1024_3$ similarly operates to apply an inverse operation to that applied by LUT circuit $824_3$, thereby converting the $2K_3$ amplitudes $826_3$ received from constellation-demapper module $1014_3$ back into a corresponding source-bit sequence $1026_3$.

Bit sequences $1026_1$, $1026_2$, and $1026_3$ are temporarily stored in buffers $1030_1$, $1030_2$, and $1030_3$, respectively. Bit sequences $1016_1$, $1016_2$, and $1016_3$ are temporarily stored in buffers $1040_1$, $1040_2$, and $1040_3$, respectively.

Control signal 1062 is used to implement a read-out of bit sequences $1026_1$, $1026_2$, and $1026_3$ from buffers $1030_1$, $1030_2$, and $1030_3$ in the manner that enables the output terminal of switch $1050_1$ to receive and direct downstream the portion of data sequence 412 corresponding to the MC frame 902 that is being decoded. Control signal 1064 is similarly used to implement a read-out of bit sequences $1016_1$, $1016_2$, and $1016_3$ from buffers $1040_1$, $1040_2$, and $1040_3$ in the manner that enables the output terminal of switch $1050_2$ to receive and direct downstream the portion of data sequence 414 corresponding to the MC frame 902 that is being decoded.

In some other embodiments, each of LUT circuits 824 (FIG. 8) can be configured to implement FIFO encoding. As already indicated above, a FIFO code operates as a block code that converts a fixed number of input bits into a fixed number of amplitudes, the fixed number being the size of the corresponding FIFO frame. In the above-described example, LUT circuits $824_3$, $824_2$, and $824_3$ can be configured to generate FIFO frames that have the sizes of $2K_1$, $2K_2$, and $2K_3$, respectively. Each of the FIFO frames is used to generate a corresponding SC sub-frame 904. The resulting three SC sub-frames 904 are combined to generate a corresponding MC frame 902, e.g., as indicated in FIG. 9. The number of source bits that is needed to generate a FIFO frame is fixed. Different FIFO codes may need different respective fixed numbers of source bits per respective FIFO frame. A complimentary LUT circuit 1024 (FIG. 10) operates to invert the FIFO encoding performed by the corresponding LUT circuit 824, thereby outputting a respective fixed number of recovered source bits per respective SC sub-frame 904.

Figure 13:
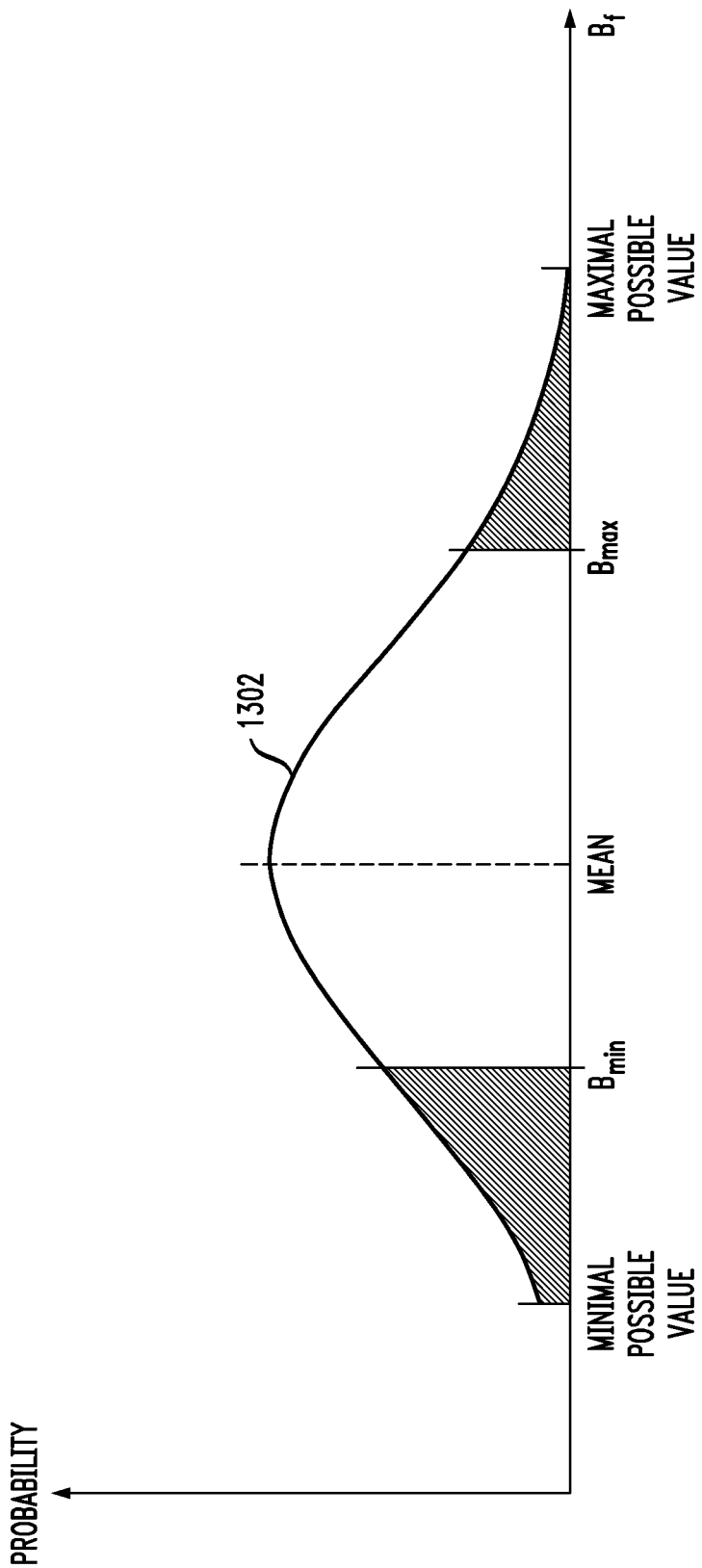
FIG. 13 graphically illustrates certain statistical properties of a shaping code that can be used in the digital circuit of FIG. 11A according to an embodiment.

In some embodiments, each of LUT circuits 824 (FIG. 8) can be configured to implement VIFO encoding. As already indicated above, a VIFO code operates as a block code that converts a variable number of input bits into a fixed number of amplitudes, the fixed number being the size of the corresponding VIFO frame. In the above-described example, LUT circuits $824_3$, $824_2$, and $824_3$ can be configured to generate VIFO frames that have the sizes of $2K_1$, $2K_2$, and $2K_3$, respectively. Each of the VIFO frames is used to generate a corresponding SC sub-frame 904. The resulting three SC sub-frames 904 are combined to generate a corresponding MC frame 902, e.g., as indicated in FIG. 9. The number of source bits that is needed to generate a VIFO frame typically varies stochastically, e.g., as indicated in FIG. 13. A complimentary LUT circuit 1024 (FIG. 10) operates to invert the VIFO encoding performed by the corresponding LUT circuit 824, thereby outputting a respective variable number of recovered source bits per respective SC sub-frame 904.

FIGS. 11-16 further illustrate embodiments configured to implement multi-code VIFO encoding and decoding. More specifically, FIGS. 11A-11B illustrate example modifications of circuit 800 that can be used to adapt that circuit to VIFO encoding. For clarity, the illustrated example corresponds to J=2, e.g., with the available SMI values being only SMI=1 and SMI=2. From the provided description, a person of ordinary skill in the art will understand how to make and use embodiments corresponding to J>2. The corresponding control method that can be used in framing controller 860 to implement VIFO encoding is described in reference to FIG. 14. FIGS. 15A-15B illustrate example modifications of circuit 1000 that can be used to make the processing implemented in that circuit complimentary to the processing implemented in the circuit shown in FIGS. 11A-11B. The corresponding control method that can be used in framing controller 1060 to implement VIFO decoding is described in reference to FIG. 16.

Figure 11A:
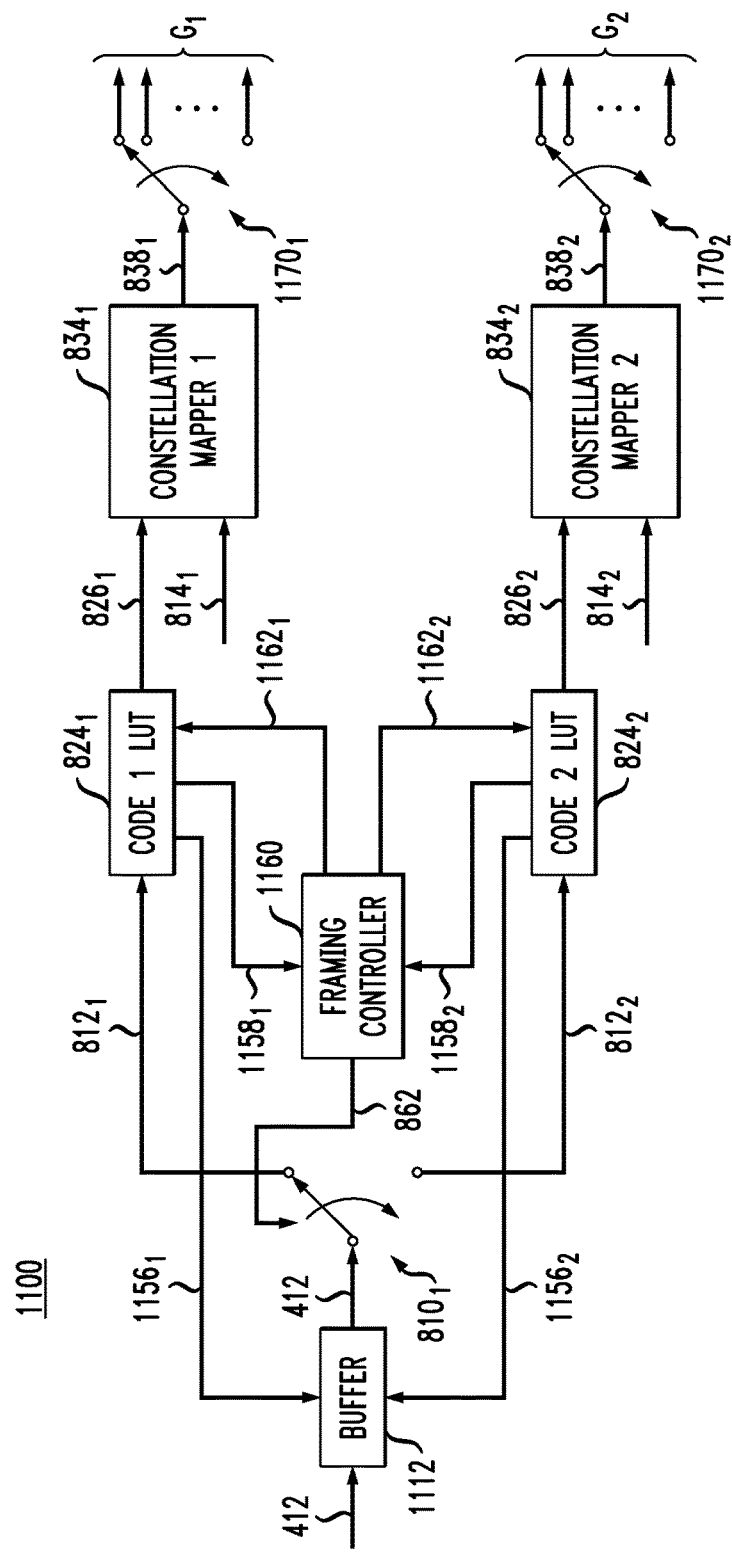
FIGS. 11A-11B show block diagrams of a digital circuit that can be used to implement a part of the digital circuit of FIG. 8 according to an embodiment.
Figures 11B, 12A, 12B:
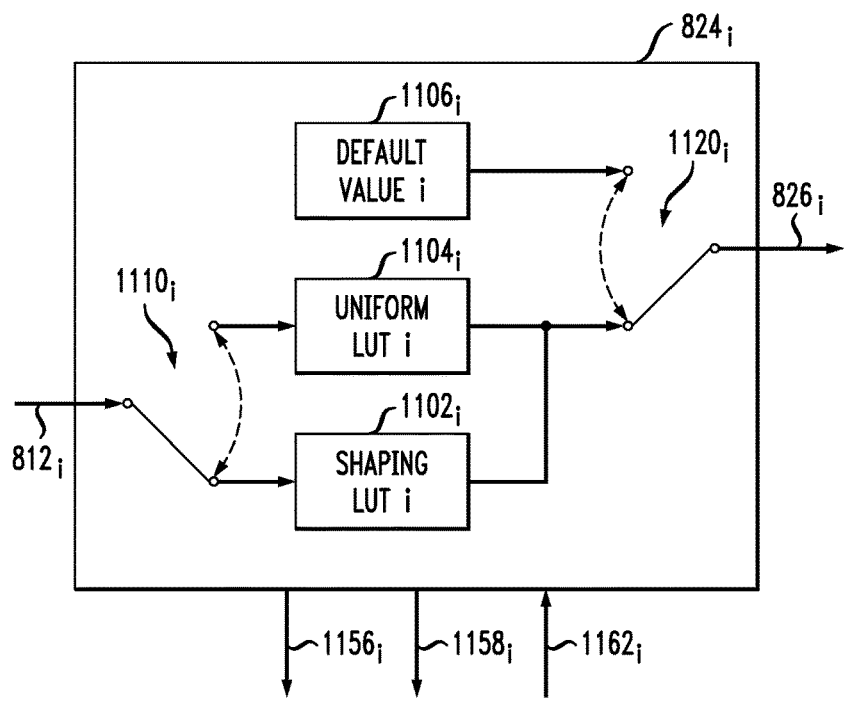
FIGS. 12A-12B show example LUTs that can be used in the LUT circuit of FIG. 11B according to an embodiment.

FIGS. 11A-11B show block diagrams of a digital circuit 1100 that can be used to implement a part of digital circuit 800 (FIG. 8) according to an embodiment. More specifically, FIG. 11A shows an overall block diagram of circuit 1100. FIG. 11B shows a block diagram of a LUT circuit $824_1$, two instances of which, i.e., LUT circuits $824_1$ and $824_2$, are used in circuit 1100.

Circuit 1100 can be used to implement an embodiment of circuit 800 corresponding to J=2. Accordingly, the number of output terminals in switch $810_1$ is reduced to two, with the two output terminals $812_1$ and $812_2$ being connected to LUT circuits $824_1$ and $824_2$, respectively. Switch $810_2$ is not explicitly shown in FIG. 11B, except for two output terminals thereof, i.e., terminals $814_1$ and $814_2$, which are connected to constellation-mapper modules $834_1$ and $834_2$, respectively. In the embodiment of FIG. 11A, switches $810_1$ and $810_2$ are controlled using the ordered SMI sequence (see Eq. (3)) as indicated above in reference to possible modifications of circuit 800 (FIG. 8).

Referring to FIG. 11B, LUT circuit $824_i$ comprises a shaping LUT $1102_i$, a uniform LUT $1104_i$, and a default-value generator $1106_i$. The active processing path through LUT circuit $824_i$ is determined by the configurations of switches $1110_i$ and $1120_i$, which are controlled by a framing controller 1160 (see FIG. 11A) by way of a control signal $1162_i$. In an example embodiment, controller 1160 can be a part of framing controller 860 (FIG. 8).

In some embodiments, one or both of uniform LUT $1104_i$ and default-value generator $1106_i$ may be absent in some or all of the corresponding LUT circuits 824.

FIGS. 12A-12B show example LUTs that can be used to implement LUTs 1102 and 1104 according to an embodiment. More specifically, FIG. 12A shows a LUT 1202 that can be used to implement one of LUTs $1102_1$ and $1102_2$. FIG. 12B shows a LUT 1204 that can be used to implement one of LUTs $1104_1$ and $1104_2$. LUTs 1202 and 1204 are intended for use in the same one of LUT circuits $824_1$ and $824_2$.

LUTs 1202 and 1204 implement codes that can be used to generate amplitudes for a 4-PAM constellation. Each of the codes has eight codewords of fixed length L=3, meaning that three 4-PAM amplitudes are generated for each input bit-word. The length of the input bit-word for the code of LUT 1202 is variable and can be any number between one and six. As such, the code of LUT 1202 is a VIFO code. The length of the input bit-word for the code of LUT 1204 is fixed and is three bits. As such, the code of LUT 1204 is a FIFO code.

For a pseudo-random input sequence (in which binary ones and zeros occur with an approximately 50% probability in an approximately random order), the code of LUT 1202 generates more "1" amplitudes than "3" amplitudes. As such, the code of LUT 1202 is a shaping code. In contrast, for the same pseudo-random input sequence, the code of LUT 1204 generates an approximately equal number of "1" and "3" amplitudes. As such, the code of LUT 1204 is a uniform code.

FIG. 13 graphically illustrates certain statistical properties of a shaping code $DM_j$ that can be implemented by a LUT circuit $824_i$ of FIG. 11B according to an embodiment. In particular, FIG. 13 graphically illustrates how LUT $1104_i$ and default-value generator $1106_i$ can be used to constrain the VIFO shaping code of LUT $1102_i$.

In general, when a VIFO shaping code analogous to the code of LUT 1202 (FIG. 12A) is used in an unconstrained manner to generate a VIFO frame of a relatively large fixed length, the corresponding number $B_f$ of source bits per frame varies approximately in accordance with a bell-shaped distribution curve, such as an example curve 1302 shown in FIG. 13. Curve 1302 starts at the "minimal possible value" of $B_f$ and ends at the "maximal possible value" of $B_f$, as indicated in FIG. 13. The corresponding distribution can potentially have very long tails that extend relatively far out from the mean value of $B_f$. Such long tails might disadvantageously require the use of relatively large buffers configured to accommodate the relatively large variability in the number of source bits per VIFO frame caused by the long tails of curve 1302.

A person of ordinary skill in the art will understand that an MC frame 902 comprising a plurality of SC sub-frames 904, each of which is a VIFO frame, will have the overall statistical properties that are qualitatively similar to those illustrated in FIG. 13.

Example embodiments disclosed herein address the above-indicated ("long-tails") problem by constraining the size of the input block of source bits for any MC frame to a narrower interval $[B_{min}, B_{max}]$, where $B_{min}$ is the allowed lower limit (which is greater than the "minimal possible value"), and $B_{max}$ is the allowed upper limit (which is smaller than the "maximal possible value"). The upper limit $B_{max}$ can be enforced by configuring switch(es) $1120_i$ (FIG. 11B) such that the output of LUT circuit $824_i$ located at reference numeral $826_i$ is connected to default-value generator $1106_i$ (see FIG. 11B) once the LUT circuit has read $B_{max}$ source bits from a buffer 1112 configured to receive data stream 412 (see FIG. 11A). When connected, default-value generator $1106_i$ can fill the remainder of the corresponding VIFO and/or MC frame with dummy amplitudes in which no payload information is encoded. The lower limit $B_{min}$ can be enforced by configuring switch(es) $1110_i$ such that the input of LUT circuit $824_i$ located at reference numeral $812_i$ is connected to LUT $1104_i$ instead of LUT $1102_i$, e.g., using a corresponding embodiment of method 1400 (see FIG. 14).

When engaged by switch $810_1$ (FIG. 11A), LUT circuit $824_i$ controls, by way of a control signal $1156_i$, the read position at buffer 1112 and thus determines how many bits are being read out of the buffer. LUT circuit $824_i$ also communicates to framing controller 1160, by was of a control signal $1158_i$, how many bits the LUT circuit has read out and processed and how many amplitudes it has generated during each look-up.

In an alternative embodiment, only LUT circuits $824_1$ and $824_2$ are each aware of how many amplitudes have to be generated for the corresponding SMI value, and the LUT circuits signal to framing controller 1160 whether or not they still have to generate amplitudes to fill up the corresponding MC frame 902 (e.g., one DMT symbol), whereas the framing controller sends a reset signal to the LUT circuits when a new MC frame 902 (e.g., a new DMT symbol) is started.

The $K_1$ QAM symbols $838_1$ generated by constellation-mapper module $834_1$ are mapped to the $K_1$ tones of group $G_1$ (see Eq. (1)) by appropriately toggling a $K_1$-way switch $1170_1$. The $K_2$ QAM symbols $838_2$ generated by constellation-mapper module $834_2$ are similarly mapped to the $K_2$ tones of group $G_2$ by appropriately toggling a $K_2$-way switch $1170_2$. In an example embodiment, the order in which the different output terminals of switches $1170_1$ and $1170_2$ are connected to their respective input terminals can be determined based on the tone-order sequence (see Eq. (2)).

FIG. 14 shows a flowchart of a control method 1400 that can be implemented in framing controller 1160 (FIG. 11A) according to an embodiment. More specifically, control method 1400 can be used to operate a plurality of LUT circuits 824 such that the size of the input block of source bits for each MC frame 902 is constrained to the interval $[B_{min}, B_{max}]$. The corresponding 2K amplitudes are partitioned between different SC sub-frames 904 such that:

$$K = \sum_j K_j \qquad (4)$$

where K is the total number of tones used in MC frame 902 for payload transmission; and $K_j$ is the number of tones in MC sub-frame $904_j$. For illustration purposes and without any implied limitations, method 1400 is described in reference to an embodiment that uses QAM constellations for all tones.

Method 1400 uses an iterative process outlined below to satisfy Eq. (4) for each MC frame 902. At least some of the 2K amplitudes are generated using shaping LUTs $1102_i$ (FIG. 11B). Some of the 2K amplitudes may be generated using uniform LUTs $1104_i$, (FIG. 11B). Some of the 2K amplitudes may be generated using default-value generators $1106_i$ (FIG. 11B).

Step 1402 of method 1400 is an initialization step at which different parameters are set to their initial values. The iterative process implemented using steps 1404-1412 then iteratively changes at least some of the initial values of step 1402 to reflect the overall progress towards the completion of the set of 2K amplitudes for the corresponding MC frame 902.

Some of the parameters set at step 1402 are as follows:
(1) n is the index that identifies the iteration number. At step 1402, the index n is set to zero;
(2) $B_0$ is the initial value of the number $B_n$ that counts the number of source bits used up for the generation of MC frame 902 after iteration n. At step 1402, $B_0$ is set to zero;
(3) $M_0$ is the initial value of the number $M_n$ that counts the number of source bits that would be encoded after iteration n if all of the amplitudes generated after this iteration were generated using uniform LUT $1104_i$, (FIG. 11B). At step 1402, $M_0$ is calculated according to the following formula:

$$M_0 = \sum_j N_j m_j,$$

where $N_j = 2K_j$; and $m_m$ is the number of bits in the binary label of each amplitude in group $G_j$; and
(4) $A_j$ is the initial value of the number $A_{jn}$ that counts down the number of amplitudes that still need to be generated for SC sub-frame $904_j$. At step 1402, the numbers $A_j$ are set to $N_j = 2K_j$ for all j.

At step 1404, the index n is incremented by one. Also, the sub-frame $904_j$ is selected for which the amplitudes will be generated during this particular iteration. The sub-frame selection is implemented at step 1404 by selecting the corresponding SMI value $j_n$. Depending on the overall metrics of the encoding process for each particular MC frame 902, method 1400 may need to perform multiple iterations per sub-frame $904_j$ or, in some situations, just a single iteration per sub-frame $904_j$. For example, method 1400 may need to perform two or more iterations per sub-frame $904_j$ if the result of the first instance of the respective step 1406 is "true," and the result of the first instance of the respective step 1412 is "false."

At step 1406, certain metrics of the encoding process are evaluated to decide whether to use the corresponding shaped LUT 1102 or the corresponding uniform LUT 1104. In an example embodiment, the following two metrics can be evaluated at step 1406:

$$B_{min} - B_{n-1} - b_{min,jn} \leq M_{n-1} - m_{jn} a_{max,jn} \qquad (5)$$

$$A_{jn} \geq a_{max,jn} \qquad (6)$$

where $b_{min,jn}$ is the minimum possible length of the input bit-word in the corresponding shaped LUT 1102; $a_{max,jn}$ is the maximum possible length of the codeword in the corresponding shaped LUT 1102; and the remaining parameters have already been defined above. For example, if the corresponding shaped LUT 1102 is LUT 1202 (FIG. 12A), then $b_{min,jn}$ is one, and $a_{max,jn}$ is three.

The metric evaluated using Eq. (5) ensures that, if the corresponding shaped LUT 1102 is used, then the corresponding worst case scenario does not cause a violation of the lower limit $B_{min}$ (also see FIG. 13). The metric evaluated using Eq. (6) ensures that, if the corresponding shaped LUT 1102 is used, then there is still sufficient number of amplitude vacancies left in sub-frame $904_j$ to accommodate the generated codeword.

If the metrics evaluated at step 1406 satisfy the criteria of Eqs. (5)-(6), then the processing of method 1400 is directed to step 1408. Otherwise the processing of method 1400 is directed to step 1410.

At step 1408, the corresponding shaping LUT 1102 is used to generate one codeword, and the values of $B_n$, $M_n$, and $A_{jn}$ are updated as follows:

$$B_n = B_{n-1} + b_n \qquad (7)$$

$$M_n = M_{n-1} - m_{jn} a_n \qquad (8)$$

$$A_{jn} = A_{jn}' - a_n \qquad (9)$$

where $b_n$ denotes the number of bits in the corresponding input bit-word; $a_n$ denotes the number of amplitudes in the generated codeword; and $A_{jn}'$ is the value of $A_{jn}$ after the previous iteration (if any) for the corresponding SMI value; and the remaining parameters have already been defined above.

At step 1410, the corresponding uniform LUT 1104 is used to generate all of the remaining amplitudes $A_{jn}$ for the corresponding sub-frame $904_j$, and the values of $B_n$ and $M_n$ are updated as follows:

$$B_n = B_{-1} + m_{jn} A_{jn} \qquad (10)$$

$$M_n = M_{n-1} - m_{jn} A_{jn} \qquad (11)$$

Step 1412 is used to enforce the upper limit $B_{max}$ for the corresponding MC frame 902 (also see FIG. 13). In an example embodiment, the following metric can be evaluated for this purpose:

$$B_{max} \le B_n \qquad (12)$$

If the criterion of Eq. (12) is not satisfied, then the processing of method 1400 is directed back to step 1404 for another iteration through steps 1404-1412. Otherwise, the processing of method 1400 is directed to step 1414.

At step 1414, the generation of the corresponding MC frame 902 is completed by using one or more default-value generators 1106 to generate amplitudes for all of the remaining amplitude vacancies in the MC frame.

As evident form the above description of method 1400, controller 1160 is aware of how many source bits have been used for the generation of each MC frame 902 and each of the constituent SC sub-frames 904$_j$. To enable proper decoding of the MC frames at the corresponding receiver, controller 1160 may be configured to communicate some or all of these numbers to the receiver, e.g., using unshaped constellation bits of the corresponding DMT symbol or using a separate communication channel. For example, such a separate communication channel can be implemented using the robust management channel (RMC), in which DMT symbols can be generated to carry control-signaling information using robust encoding/modulation. Alternatively, such a separate communication channel can be implemented using reserved tones that are typically robustly modulated. Yet another possible implementation involves the use of sign bits 814, some of which can be used to carry the above-mentioned numbers. Besides the numbers of source bits per MC frame, the delimiters (e.g., start and/or end) of different DTUs within the MC frame can also be communicated in the same manner.

The corresponding receiver can use the information about the number(s) of source bits to make sure that the number of bits generated by decoding an MC frame corresponds to the signaled number, for example, by discarding excess bits or appending dummy bits. Alternatively, the entire MC frame can be discarded in case any discrepancy arises.

In some embodiments, method 1400 can be modified to incorporate/enable one or more of the following features.

In some embodiments, either the lower limit $B_{min}$ or the upper limit $B_{max}$, or both, can be removed. When both limits are removed, controller 1160 is configured to count the number(s) of source bits per MC frame 902 and/or each SC sub-frame 904$_j$.

In some other embodiments, the lower limit $B_{min}$ and the upper limit $B_{max}$ can be equal (i.e., $B_{min}=B_{max}$). In that case, the encoding becomes of the FIFO type, and the number of source bits does not need to be signaled to the peer receiver.

In some embodiments, method 1400 can be adapted for VIVO encoding.

Figure 15A:
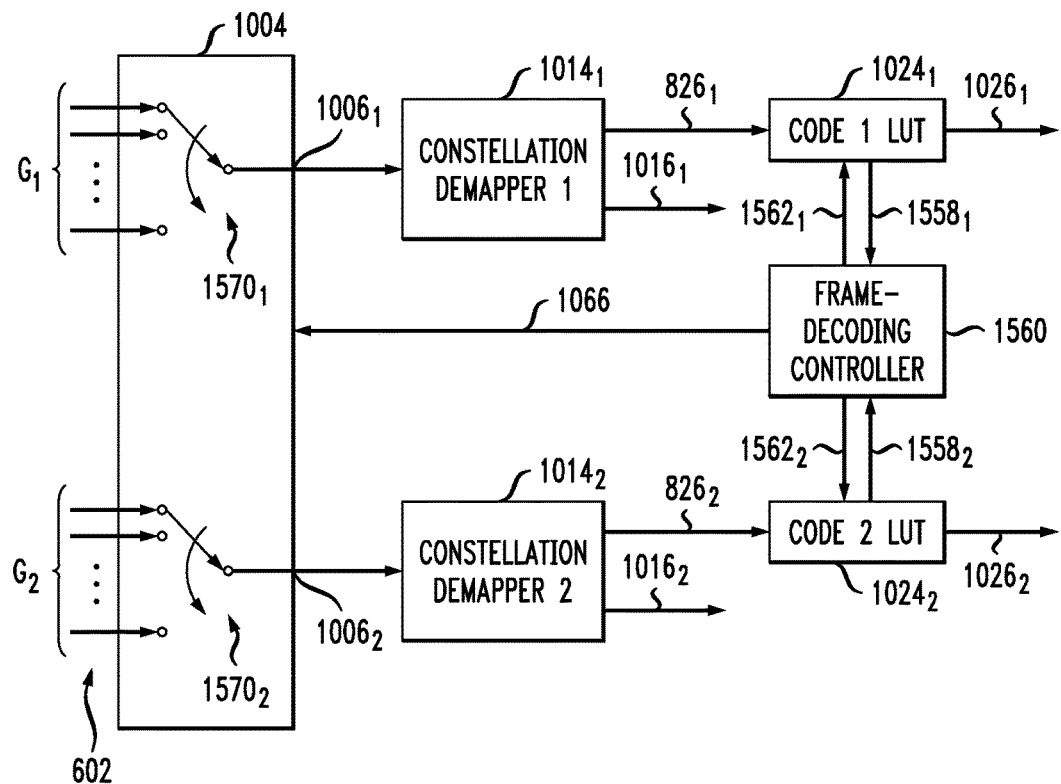
FIGS. 15A-15B show block diagram of a digital circuit that can be used to implement a part of the digital circuit of FIG. 10 according to an embodiment.
Figure 15B:
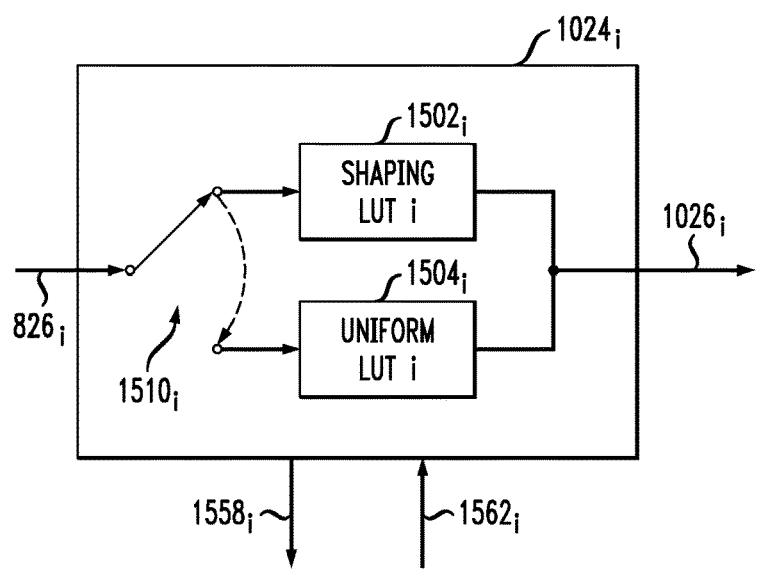

FIGS. 15A-15B show block diagrams of a digital circuit 1500 that can be used to implement a part of digital circuit 1000 (FIG. 10) according to an embodiment. More specifically, FIG. 15A shows an overall block diagram of circuit 1500. FIG. 15B shows a block diagram of a LUT circuit 1024$_i$, two instances of which, i.e., LUT circuits 1024$_1$ and 1024$_2$, are used in circuit 1500. Circuit 1500 is configured to operate such that the processing implemented therein is complementary to the processing in circuit 1100 (FIGS. 11A-11B). A frame-decoding controller 1560 used in circuit 1500 for this purpose can be a part of framing controller 1060 (FIG. 10).

Sorter 1004 of circuit 1500 comprises switches 1570$_1$ and 1570$_2$. In response to control signal 1066 (also see FIG. 10), switch 1570$_1$ operates to direct to constellation-demapper module 1014$_1$, in an appropriate order, the digital samples 602 corresponding to the tones of group $G_1$, thereby generating stream 1006$_1$. Switch 1570$_2$ operates to direct to constellation-demapper module 1014$_2$, in an appropriate order, the digital samples 602 corresponding to the tones of group $G_2$, thereby generating stream 1006$_2$.

Constellation-demapper module 1014$_1$ uses constellation $C_1$ and digital samples 1006$_1$ to recover $2K_1$ amplitudes 826$_1$ and the corresponding $2K_1$ sign bits 1016$_1$ (also see FIG. 10). Constellation-demapper module 1014$_2$ similarly uses constellation $C_2$ and digital samples 1006$_2$ to recover $2K_2$ amplitudes 826$_2$ and the corresponding $2K_2$ sign bits 1016$_2$ (also see FIG. 10).

LUT circuit 1024$_1$ operates to apply an inverse operation to that applied by LUT circuit 824$_1$ (FIG. 11A), thereby converting the $2K_1$ amplitudes 826$_1$ received from constellation-demapper module 1014$_1$ back into a corresponding source-bit sequence 1026$_1$. LUT circuit 1024$_2$ similarly operates to apply an inverse operation to that applied by LUT circuit 824$_2$ (FIG. 11A), thereby converting the $2K_2$ amplitudes 826$_2$ received from constellation-demapper module 1014$_2$ back into a corresponding source-bit sequence 1026$_2$.

Referring to FIG. 15B, LUT circuit 1024$_i$ comprises a shaping LUT 1502$_i$ and a uniform LUT 1504$_i$. The active processing path through LUT circuit 1024$_i$ is determined by the configuration of a switch 1510$_i$, which is controlled by frame-decoding controller 1560 (see FIG. 11A) by way of a control signal 1562$_i$. Frame-decoding controller 1560 generates control signal 1562$_i$ based on a feedback signal 1558$_i$ that communicates to the frame-decoding controller certain metrics of the decoding process of the corresponding MC frame 902, e.g., as explained in more detail below in reference to FIG. 16.

In an example embodiment, LUT 1202 (FIG. 12A) can be used to implement one of LUTs 1502$_1$ and 1502$_2$. LUT 1204 (FIG. 12B) can similarly be used to implement one of LUTs 1504$_1$ and 1504$_2$.

In some embodiments, uniform LUT 1504$_i$ may be absent in some or all of the corresponding LUT circuits 1024$_i$.

Figure 16:
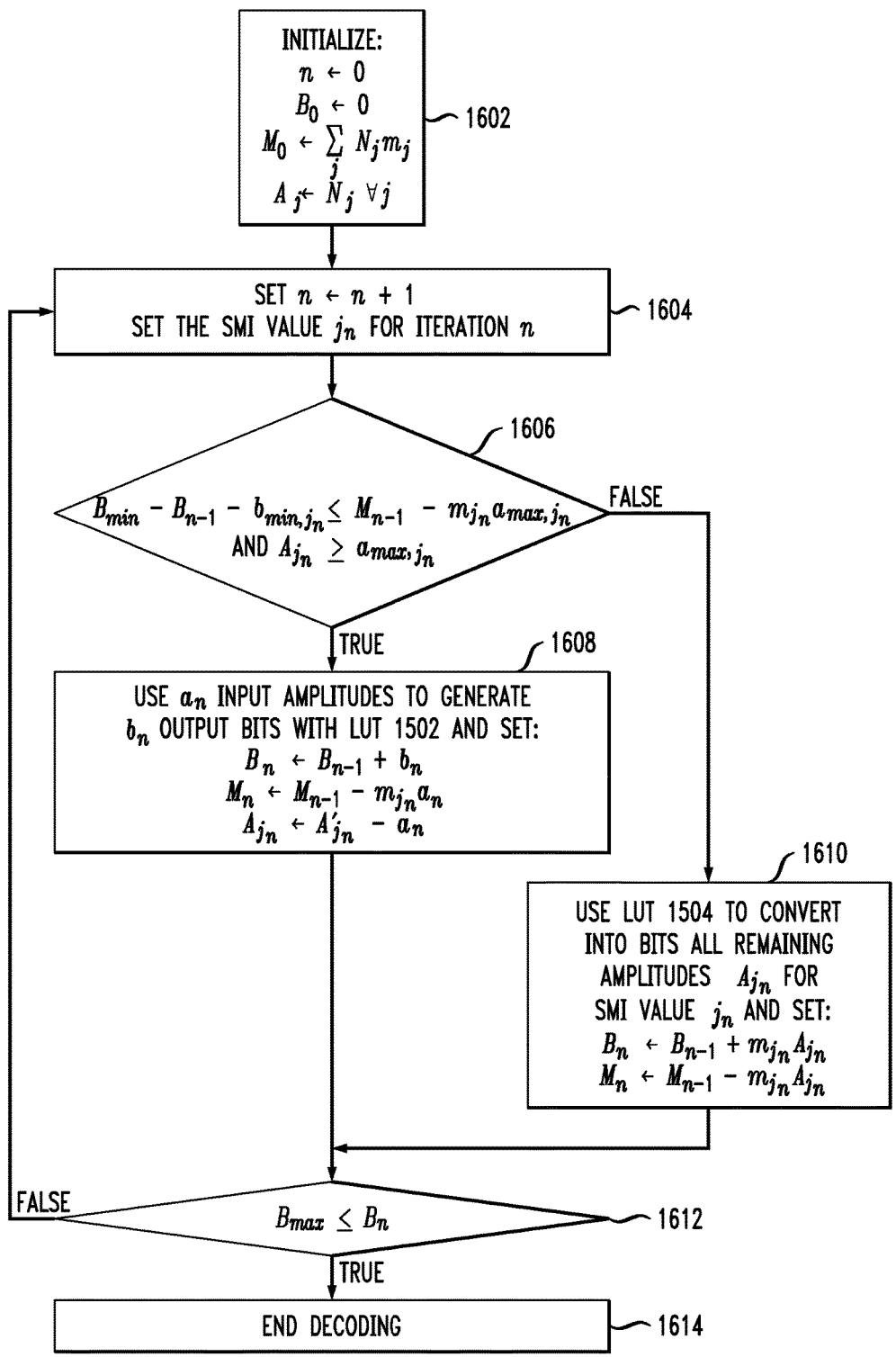
FIG. 16 shows a flowchart of a control method that can be implemented in the digital circuit of FIG. 15A according to an embodiment.

FIG. 16 shows a flowchart of a control method 1600 that can be implemented in frame-decoding controller 1560 (FIG. 15A) according to an embodiment. More specifically, control method 1600 can be used to operate circuit 1500 such that the corresponding frame-decoding processing is capable of properly decoding MC frames 902 generated using circuit 1100 (FIG. 11A) and method 1400 (FIG. 14).

Similar to method 1400, method 1600 uses an iterative process that enables circuit 1500 to recover the source bits encoded in the 2K amplitudes of each MC frame 902. This iterative process relies on at least some of the same metrics used in method 1400. Based on the metrics, at least some of the 2K amplitudes are decoded using shaping LUTs 1502$_i$ (FIG. 15B). Some of the 2K amplitudes may be decoded using uniform LUTs 1504$_i$, (FIG. 15B). Some of the 2K amplitudes may be discarded if it is determined that those amplitudes carry default values rather than payload data.

Step 1602 of method 1600 is an initialization step at which different parameters are set to their initial values. The iterative process implemented using steps 1604-1612 then iteratively changes at least some of the initial values of step 1602 to reflect the overall progress towards the completion of the decoding of the corresponding MC frame 902. In an example embodiment, step 1602 may be implemented similar to step 1402 of method 1400.

At step 1604, the iteration index n is incremented by one. Also, the sub-frame 904$_j$ is selected for which the amplitudes will be decoded during this particular iteration. The sub-frame selection is implemented at step 1604 by selecting the corresponding SMI value $j_n$. In an example embodiment, step 1604 may be implemented similar to step 1404 of method 1400.

At step 1606, the metrics expressed by Eqs. (5) and (6) are evaluated to decide which processing path is to be activated in the corresponding LUT circuit 1024 (FIG. 15A) during this particular iteration. If the metrics evaluated at step 1606 satisfy the criteria of Eqs. (5)-(6), then the processing of method 1600 is directed to step 1608. Otherwise the processing of method 1600 is directed to step 1610.

At step 1608, the corresponding shaping LUT 1502 is used to decode one codeword, and the values of $B_n$, $M_n$, and $A_{jn}$ are updated in accordance with Eqs. (7)-(9).

At step 1610, the corresponding uniform LUT 1504 is used to decode all of the remaining amplitudes $A_{jn}$ for the corresponding sub-frame 904$_j$, and the values of $B_n$ and $M_n$ are updated in accordance with Eqs. (10)-(11).

Step 1612 is used to determine whether or not the upper limit $B_{max}$ was reached during the corresponding encoding iteration of method 1400. In an example embodiment, step 1612 may rely on the metric expressed by Eq. (12) and be implemented similar to step 1412 of method 1400.

If the criterion of Eq. (12) is not satisfied, then the processing of method 1600 is directed back to step 1604 for another iteration through steps 1604-1612. Otherwise, the processing of method 1600 is directed to step 1614.

At step 1614, the remaining non-decoded amplitudes (if any) of the corresponding MC frame 902 are discarded as being deemed to carry default values rather than payload data. Step 1614 thereby completes the decoding of this MC frame.

In some embodiments, some of the tones may be left out of the MC frame even if these tones carry payload data. For example, no shaping code may be applied to payload data carried on the tones that use relatively low modulation orders (e.g., BPSK or QPSK).

According to an example embodiment disclosed above, e.g., in the summary section and/or in reference to any one or any combination of some or all of FIGS. 1-16, provided is an apparatus (e.g., 110 or 150, FIG. 1) comprising a data transmitter (e.g., 200, FIG. 2) that comprises an electrical analog front end (e.g., 240, FIG. 2), a digital signal processor (e.g., 204, FIG. 2), and an electronic controller (e.g., 440, FIG. 4), the electronic controller being configured to: interpret an index value (e.g., SMI, FIG. 5) assigned to a set of tones configurable to carry data and generate one or more corresponding control signals (e.g., 442, 444, 446, FIG. 4) such that, in response to the one or more control signals, the digital signal processor is configured to use, for each of such index values, a respective predefined pair of settings, the predefined pair including a respective predefined constellation (e.g., $C_j$, FIG. 5) and a respective predefined shaping code (e.g., $DM_j$, FIG. 5); and generate the one or more corresponding control signals in response to a control message (e.g., of 708, FIG. 7) having specified therein two or more different index values, each of the two or more different index values being assigned to a respective different set of tones; and wherein the digital signal processor is configured to drive the analog front end to cause a modulated electrical signal (e.g., 242, FIG. 2) generated by the analog front end to carry the data.

In some embodiments of the above apparatus, the two or more different index values are selectable (e.g., at 704, FIG. 7) from a fixed set of different index values, the fixed set including at least two different index values; and wherein, for any two different index values from the fixed set, two respective predefined pairs of settings differ from one another either in the respective predefined constellations (e.g., $C_{j1} \neq C_{j2}$) or in the respective predefined shaping codes (e.g., $DM_{j1} \neq DM_{j2}$), or in both the respective predefined constellations and the respective predefined shaping codes.

In some embodiments of any of the above apparatus, the data transmitter is configured to receive the control message from a corresponding data receiver (e.g., 300, FIG. 3) or from an electronic management entity (e.g., system-configuration controller).

In some embodiments of any of the above apparatus, the data transmitter is a part of a modem (e.g., 150, FIG. 1) or is a part of a service distribution unit (e.g., 110, FIG. 1).

In some embodiments of any of the above apparatus, the electronic controller comprises a memory having stored therein a look-up table (e.g., 500, FIG. 5), the look-up table having specified therein a respective predefined constellation (e.g., $C_j$, FIG. 5) and a respective predefined shaping code (e.g., $DM_j$, FIG. 5) for each index value of a fixed set of different index values, the fixed set including at least two different index values.

In some embodiments of any of the above apparatus, the look-up table further has specified therein a respective partition coefficient (e.g., $P_j$, FIG. 5) for each index value of the fixed set of different index values, the partition coefficient specifying a ratio of a first bit-rate and a second bit-rate, the first bit-rate being a bit-rate at which source bits are to be supplied for being encoded in sign bits of constellation symbols of the respective predefined constellation, and the second bit-rate being a bit-rate at which source bits are to be supplied for being encoded in amplitudes of the constellation symbols of the respective predefined constellation.

In some embodiments of any of the above apparatus, the electronic controller is further configured to generate the one or more corresponding control signals using a tone-order sequence (e.g., Eq. (2)), the tone-order sequence having specified therein an order in which constellation symbols corresponding to different tones are to be handled during digital signal processing.

In some embodiments of any of the above apparatus, the control message is configured to provide the tone-order sequence.

According to another example embodiment disclosed above, e.g., in the summary section and/or in reference to any one or any combination of some or all of FIGS. 1-16, provided is an apparatus (e.g., 110 or 150, FIG. 1) comprising a data receiver (e.g., 300, FIG. 3) that comprises an electrical analog front end (e.g., 310, FIG. 3), a digital signal processor (e.g., 324, FIG. 3), and an electronic controller (e.g., 640, FIG. 6), the digital signal processor being configured to process a stream of values (e.g., 322, FIG. 3) representing an electrical signal (e.g., 312, FIG. 3) outputted by the electrical analogue front end in response to a received input signal having a plurality of modulated carriers, the electronic controller being configured to: interpret an index value (e.g., SMI, FIG. 5) assigned to a set of tones configurable to carry data and generate one or more corresponding control signals (e.g., 642, 644, 646, FIG. 6) such that, in response to the one or more control signals, the digital signal processor is configured to use, for each of such index values, a respective predefined pair of settings, the predefined pair including a respective predefined constellation (e.g., $C_j$, FIG. 5) and a respective predefined shaping code (e.g., $DM_j$, FIG. 5); and generate the one or more corresponding control signals in response to a configuration setting (e.g., of 708, FIG. 7) having specified therein two or more different index values, each of the two or more different index values being assigned to a respective different set of tones; and wherein the digital signal processor is configured to process the stream of values to recover source data carried by the plurality of modulated carriers.

In some embodiments of the above apparatus, the two or more different index values are selectable (e.g., at 704, FIG. 7) from a fixed set of different index values, the fixed set including at least two different index values; and wherein, for any two different index values from the fixed set, two respective predefined pairs of settings differ from one another either in the respective predefined constellations (e.g., $C_{j1} \neq C_{j2}$) or in the respective predefined shaping codes (e.g., $DM_{j1} \neq DM_{j2}$), or in both the respective predefined constellations and the respective predefined shaping codes.

In some embodiments of any of the above apparatus, the data receiver is configured to: obtain (e.g., at 702, FIG. 7) frequency-dependent SNR information for a communication line (e.g., 140, FIG. 1) configured to apply the received input signal thereto; and assign (e.g., at 704, FIG. 7) the two or more different index values to the respective different sets of tones using the frequency-dependent SNR information.

In some embodiments of any of the above apparatus, the data receiver is configured to send a control message to a corresponding data transmitter (e.g., 200, FIG. 2) or to an electronic management entity (e.g., system-configuration controller), the control message having specified therein the two or more different index values.

In some embodiments of any of the above apparatus, the data receiver is a part of a modem (e.g., 150, FIG. 1) or is a part of a service distribution unit (e.g., 110, FIG. 1).

In some embodiments of any of the above apparatus, the electronic controller comprises a memory having stored therein a look-up table (e.g., 500, FIG. 5), the look-up table having specified therein a respective predefined constellation (e.g., $C_j$, FIG. 5) and a respective predefined shaping code (e.g., $DM_j$, FIG. 5) for each index value of a fixed set of different index values, the fixed set including at least two different index values.

In some embodiments of any of the above apparatus, the electronic controller is further configured to generate the one or more corresponding control signals using a tone-order sequence (e.g., Eq. (2)), the tone-order sequence having specified therein an order in which constellation symbols corresponding to different tones are to be handled during digital signal processing.

In some embodiments of any of the above apparatus, the data receiver is configured to send a control message to a corresponding data transmitter (e.g., 200, FIG. 2), the control message having specified therein the two or more different index values and the tone-order sequence.

According to yet another example embodiment disclosed above, e.g., in the summary section and/or in reference to any one or any combination of some or all of FIGS. 1-16, provided is a communication method comprising the steps of: configuring an electronic controller (e.g., 440, FIG. 4; 640, FIG. 6) to interpret an index value (e.g., SMI, FIG. 5) assigned to a set of tones configurable to carry data such that, for each of such index values, the electronic controller causes digital signal processing corresponding to the set of tones to use a respective predefined pair of settings, the predefined pair including a respective predefined constellation (e.g., $C_j$, FIG. 5) and a respective predefined shaping code (e.g., $DM_j$, FIG. 5); and communicating (e.g., at 708, FIG. 7) to the electronic controller two or more different index values, each of the two or more different index values being assigned to a respective different set of tones.

In some embodiments of the above method, method further comprises selecting (e.g., at 704, FIG. 7) the two or more different index values from a fixed set of different index values, the fixed set including at least two different index values; and wherein, for any two different index values from the fixed set, two respective predefined pairs of settings differ from one another either in the respective predefined constellations (e.g., $C_{j1} \neq C_{j2}$) or in the respective predefined shaping codes (e.g., $DM_{j1} \neq DM_{j2}$), or in both the respective predefined constellations and the respective predefined shaping codes.

In some embodiments of any of the above methods, the method further comprises obtaining (e.g., at 702, FIG. 7) frequency-dependent SNR information for a communication line (e.g., 140, FIG. 1) configured to transmit the tones; and wherein the step of selecting comprises using (e.g., at 704, FIG. 7) the frequency-dependent SNR information to assign the two or more different index values to the respective different sets of tones.

In some embodiments of any of the above methods, the step of communicating comprises sending to a data transmitter (e.g., 200, FIG. 2) a control message specifying the two or more different index values, the data transmitter including the electronic controller.

In some embodiments of any of the above methods, the data transmitter is a part of a DMT modem (e.g., 150, FIG. 1) or is a part of a DMT-service distribution unit (e.g., 110, FIG. 1).

In some embodiments of any of the above methods, the step of communicating comprises sending from a data receiver (e.g., 300, FIG. 3) to a data transmitter (e.g., 200, FIG. 2) a control message specifying the two or more different index values, the data transmitter including the electronic controller.

In some embodiments of any of the above methods, the data receiver is a part of a DMT modem (e.g., 150, FIG. 1) or is a part of a DMT-service distribution unit (e.g., 110, FIG. 1).

In some embodiments of any of the above methods, the step of configuring comprises providing the electronic controller with a look-up table (e.g., 500, FIG. 5), the look-up table having specified therein a respective predefined constellation (e.g., $C_j$, FIG. 5) and a respective predefined shaping code (e.g., $DM_j$, FIG. 5) for each index value of a fixed set of different index values, the fixed set including at least two different index values.

In some embodiments of any of the above methods, the look-up table further has specified therein a respective partition coefficient (e.g., $P_j$, FIG. 5) for each index value of the fixed set of different index values, the partition coefficient specifying a ratio of a first bit-rate and a second bit-rate, the first bit-rate being a bit-rate at which source bits are to be supplied for being encoded in sign bits of constellation symbols of the respective predefined constellation, and the second bit-rate being a bit-rate at which source bits are to be supplied for being encoded in amplitudes of the constellation symbols of the respective predefined constellation.

In some embodiments of any of the above methods, the method further comprises communicating (e.g., at 708, FIG. 7) to the electronic controller a tone-order sequence (e.g., Eq. (2)), the tone-order sequence having specified therein an order in which constellation symbols corresponding to different tones are to be handled during digital signal processing.

According to yet another an example embodiment disclosed above, e.g., in the summary section and/or in reference to any one or any combination of some or all of FIGS. 1-16, provided is an apparatus (e.g., 110 or 150, FIG. 1) comprising a data transmitter (e.g., 200, FIG. 2) that comprises an electrical analog front end (e.g., 240, FIG. 2), a digital signal processor (e.g., 204, FIG. 2), and an electronic controller (e.g., 440, FIG. 4), wherein the digital signal processor is configured to run a plurality of shaping codes (e.g., a subset of $DM_{10}$-$DM_J$, FIG. 5), each of the shaping codes being configured to generate amplitudes of constellation symbols of a respective constellation (e.g., one of $C_1$-$C_J$, FIG. 5); wherein the electronic controller is configured to cause the digital signal processor to run each of the shaping codes as a block code, each of the block codes being configured to convert a respective block of source bits (e.g., 412, FIG. 4) into a respective block of amplitudes (e.g., 422, FIG. 4), the respective block of amplitudes having (e.g., consisting of) a respective fixed number (e.g., $2K_j$, Eq. (4)) of amplitudes; wherein the respective fixed number of amplitudes is selected to be an integer multiple of a respective number of tones (e.g., $K_j$, Eq. (4)) in a respective set of tones (e.g., $G_j$, Eq. (1)) modulated using the respective constellation; wherein a sum of the respective numbers of tones is equal to a number of tones available to carry the source bits in one DMT symbol (e.g., as expressed by Eq. (4)); and wherein the digital signal processor is configured to drive the analog front end to cause a modulated electrical signal (e.g., 242, FIG. 2) generated by the analog front end to carry the constellation symbols.

In some embodiments of the above apparatus, a sum of the respective fixed numbers of amplitudes is equal to a number of amplitudes available to carry the source bits in exactly one DMT symbol.

In some embodiments of any of the above apparatus, the respective block of source bits has (e.g., consists of) a respective number of bits, the respective number of bits being capable to vary from one run to another run of the block code (e.g., in accordance with 1302, FIG. 13).

In some embodiments of any of the above apparatus, the electronic controller is further configured to cause the digital signal processor to constrain a total number of source bits per DMT symbol to a range (e.g., $[B_{min}, B_{max}]$, FIG. 13) that is narrower than a range possible without such constrain.

In some embodiments of any of the above apparatus, the digital signal processor is configured to implement a shaping code of the plurality using a first look-up table (e.g., 1102, FIG. 11B; 1502, FIG. 15B) and a second look-up table (e.g., 1104, FIG. 11B; 1504, FIG. 15B), the first look-up table representing a code according to which some amplitudes have different respective probabilities of occurrence (e.g., as for 1202, FIG. 12A), and the second look-up table representing a code according to which different amplitudes have a same constant probability of occurrence (e.g., as for 1204, FIG. 12B); and wherein the electronic controller is configured to cause the digital signal processor to switch between using the first look-up table and using the second look-up table based on an evaluation of one or more metrics (e.g., Eqs. (5), (6), (12)) of blocks that are being processed with the plurality of shaping codes.

In some embodiments of any of the above apparatus, the digital signal processor is further configured to implement the shaping code of the plurality using a default-value generator (e.g., 1106, FIG. 11B); and wherein the electronic controller is further configured to cause the digital signal processor to switch between using the first look-up table, using the second look-up table, and using the default-value generator based on the evaluation of the one or more metrics of the blocks that are being processed with the plurality of shaping codes.

In some embodiments of any of the above apparatus, the data transmitter is configured to: count a respective total number of source bits encoded in each particular DMT symbol; and communicate the respective total numbers to a corresponding data receiver.

In some embodiments of any of the above apparatus, the data transmitter is a part of a modem (e.g., 150, FIG. 1) or is a part of a service distribution unit (e.g., 110, FIG. 1).

According to yet another example embodiment disclosed above, e.g., in the summary section and/or in reference to any one or any combination of some or all of FIGS. 1-16, provided is an apparatus (e.g., 110 or 150, FIG. 1) comprising a data receiver (e.g., 300, FIG. 3) that comprises an electrical analog front end (e.g., 310, FIG. 3), a digital signal processor (e.g., 324, FIG. 3), and an electronic controller (e.g., 640, FIG. 6), wherein the digital signal processor is configured to: process a stream of values (e.g., 322, FIG. 3) representing an electrical signal (e.g., 312, FIG. 3) outputted by the electrical analogue front end in response to a received input signal having a plurality of modulated carriers; and run a plurality of shaping codes (e.g., a subset of $DM_1$-$DM_J$, FIG. 5), each of the shaping codes being configured to handle (e.g., generate or decode) amplitudes of constellation symbols of a respective constellation (e.g., one of $C_1$-$C_J$, FIG. 5); wherein the electronic controller is configured to cause the digital signal processor to run each of the shaping codes as a block code, each of the block codes being configured to convert a respective block of amplitudes (e.g., 422, FIG. 6) into a respective block of source bits (e.g., 412, FIG. 6), the respective block of amplitudes having (e.g., consisting of) a respective fixed number (e.g., $2K_j$, Eq. (4)) of amplitudes; wherein the respective fixed number of amplitudes is an integer multiple of a respective number of tones (e.g., $K_j$, Eq. (4)) in a respective set of tones (e.g., $G_j$, Eq. (1)) modulated using the respective constellation; and wherein a sum of the respective numbers of tones is equal to a number of tones configured to carry the source bits in one DMT symbol (e.g., as expressed by Eq. (4)); and wherein the digital signal processor is configured to process the stream of values to recover the source bits carried by the plurality of modulated carriers.

According to yet another example embodiment disclosed above, e.g., in the summary section and/or in reference to any one or any combination of some or all of FIGS. 1-16, provided is a communication method comprising the steps of: configuring a digital signal processor (e.g., 204, FIG. 2; 324, FIG. 3) to run a plurality of shaping codes (e.g., a subset of $DM_1$-$DM_J$, FIG. 5), each of the shaping codes being configured to handle (e.g., generate or decode) amplitudes of constellation symbols of a respective constellation (e.g., one of $C_1$-$C_J$, FIG. 5); and configuring an electronic controller (e.g., 440, FIG. 4; 640, FIG. 6) to cause the digital signal processor to run each of the shaping codes as a block code, each of the block codes being configured to interconvert a respective block of source bits (e.g., 412, FIGS. 4, 6) and a respective block of amplitudes (e.g., 422, FIGS. 4, 6), the respective block of amplitudes having (e.g., consisting of) a respective fixed number (e.g., $2K_j$, Eq. (4)) of amplitudes; wherein the respective fixed number of amplitudes is selected to be an integer multiple of a respective number of tones (e.g., $K_j$, Eq. (4)) in a respective set of tones (e.g., $G_j$, Eq. (1)) modulated using the respective constellation; and wherein a sum of the respective numbers of tones is equal to a number of tones available to carry the source bits in one DMT symbol (e.g., as expressed by Eq. (4)).

In some embodiments of the above method, a sum of the respective fixed numbers of amplitudes is equal to a number of amplitudes available to carry the source bits in exactly one DMT symbol.

In some embodiments of any of the above methods, the digital signal processor is configured to run a first shaping code of the plurality as a block code characterized by a first fixed number (e.g., $2K_1$, $826_1$, FIGS. 8, 10) of amplitudes; and wherein the digital signal processor is configured to run a second shaping code of the plurality as a block code characterized by a second fixed number (e.g., $2K_2$, $826_2$, FIGS. 8, 10) of amplitudes, the second fixed number being different form the first fixed number (e.g., $K_1 \neq K_2$).

In some embodiments of any of the above methods, the respective block of source bits has (e.g., consists of) a respective number of bits, the respective number of bits being capable to vary from one run to another run of the block code (e.g., in accordance with 1302, FIG. 13).

In some embodiments of any of the above methods, the method further comprises configuring the electronic controller to cause the digital signal processor to constrain a total number of source bits per DMT symbol to a range (e.g., $[B_{min}, B_{max}]$, FIG. 13) that is narrower than a range possible without such constrain.

In some embodiments of any of the above methods, the digital signal processor is configured to implement a shaping code of the plurality using a first look-up table (e.g., 1102, FIG. 11B; 1502, FIG. 15B) and a second look-up table (e.g., 1104, FIG. 11B; 1504, FIG. 15B), the first look-up table representing a code according to which some amplitudes have different respective probabilities of occurrence (e.g., as for 1202, FIG. 12A), and the second look-up table representing a code according to which different amplitudes have a same constant probability of occurrence (e.g., as for 1204, FIG. 12B); and wherein the electronic controller is configured to cause the digital signal processor to switch between using the first look-up table and using the second look-up table based on an evaluation of one or more metrics (e.g., Eqs. (5), (6), (12)) of blocks that are being processed with the plurality of shaping codes.

In some embodiments of any of the above methods, the method further comprises: counting a respective total number of source bits encoded in each particular DMT symbol at a data transmitter; and communicating the respective total numbers to a corresponding data receiver.

In some embodiments of any of the above methods, the digital signal processor is a part of a DMT modem (e.g., 150, FIG. 1) or is a part of a DMT-service distribution unit (e.g., 110, FIG. 1).

In some embodiments of any of the above methods, the digital signal processor is a part of a data transmitter (e.g., 200, FIG. 2) and is configured to encode a stream of source bits (e.g., 202, FIG. 2) for transmission using one or more corresponding DMT symbols.

In some embodiments of any of the above methods, the digital signal processor is a part of a data receiver (e.g., 300, FIG. 3) and is configured to decode one or more received DMT symbols to recover a corresponding stream of source bits encoded therein.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term compatible means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising a data transmitter that comprises an electrical analog front end, a digital signal processor, and an electronic controller, the digital signal processor including a shaping encoder and a constellation mapper, the electronic controller being configured to:
   interpret two or more different index values, each of the two or more different index values being assigned to a different respective set of tones configurable to carry data; and
   cause the shaping encoder and the constellation mapper to use, for each of the two or more different index values, a respective predefined pair of settings to generate constellation symbols encoded with the data for transmission on the different respective set of tones, the predefined pair including a respective predefined constellation and a respective predefined shaping code; and
   wherein the digital signal processor is configured to drive the analog front end to cause a modulated electrical signal generated by the analog front end to carry the constellation symbols.

2. The apparatus of claim 1,
   wherein the two or more different index values are selectable from a fixed set of different index values, the fixed set including at least two different index values; and
   wherein, for any two different index values from the fixed set, two respective predefined pairs of settings differ from one another either in the respective predefined constellations or in the respective predefined shaping codes, or in both the respective predefined constellations and the respective predefined shaping codes.

3. The apparatus of claim 1, wherein the data transmitter is configured to receive a control message from a corresponding data receiver or from an electronic management entity, the control message having specified therein the two or more different index values.

4. The apparatus of claim 1, wherein the data transmitter is a part of a modem or is a part of a service distribution unit.

5. The apparatus of claim 1, wherein the electronic controller comprises a memory having stored therein a look-up table, the look-up table having specified therein a respective predefined constellation and a respective predefined shaping code for each index value of a fixed set of different index values, the fixed set including at least two different index values.

6. The apparatus of claim 5, wherein the look-up table further has specified therein a respective partition coefficient for each index value of the fixed set of different index values, the partition coefficient specifying a ratio of a first bit-rate and a second bit-rate, the first bit-rate being a bit-rate at which source bits are to be supplied for being encoded in sign bits of the constellation symbols of the respective predefined constellation, and the second bit-rate being a bit-rate at which source bits are to be supplied for being encoded in amplitudes of the constellation symbols of the respective predefined constellation.

7. The apparatus of claim 1, wherein the electronic controller is further configured to generate one or more corresponding control signals for the digital signal processor using a tone-order sequence, the tone-order sequence having specified therein an order in which constellation symbols corresponding to different tones are to be generated by the digital signal processor.

8. The apparatus of claim 7, wherein the data transmitter is configured to receive a control message from a corresponding data receiver or from an electronic management entity, the control message having specified therein the tone-order sequence.

9. An apparatus comprising a data receiver that comprises an electrical analog front end, a digital signal processor, and an electronic controller, the digital signal processor including a constellation demapper and a shaping decoder and being configured to process a stream of values representing an electrical signal outputted by the electrical analog front end in response to a received frequency-division-multiplexed input signal, the electronic controller being configured to:

interpret two or more different index values, each of the two or more different index values being assigned to a different respective set of tones configurable to carry data; and cause the constellation demapper and the shaping decoder to use, for each of the two or more index values, a respective predefined pair of settings to demap and decode a respective portion of the stream of values, the predefined pair including a respective predefined constellation and a respective predefined shaping code; and wherein the digital signal processor is configured to process the stream of values to recover the data.

10. The apparatus of claim 9, wherein the two or more different index values are selectable from a fixed set of different index values, the fixed set including at least two different index values; and wherein, for any two different index values from the fixed set, two respective predefined pairs of settings differ from one another either in the respective predefined constellations or in the respective predefined shaping codes, or in both the respective predefined constellations and the respective predefined shaping codes.

11. The apparatus of claim 10, wherein the data receiver is configured to:

obtain frequency-dependent signal-to-noise ratio (SNR) information corresponding to the received input signal; and assign the two or more different index values to the respective different sets of tones using the frequency-dependent SNR information.

12. The apparatus of claim 9, wherein the data receiver is configured to send a control message to a corresponding data transmitter or to an electronic management entity, the control message having specified therein the two or more different index values.

13. The apparatus of claim 9, wherein the data receiver is a part of a modem or is a part of a service distribution unit.

14. The apparatus of claim 9, wherein the electronic controller comprises a memory having stored therein a look-up table, the look-up table having specified therein a respective predefined constellation and a respective predefined shaping code for each index value of a fixed set of different index values, the fixed set including the two or more different index values.

15. The apparatus of claim 9, wherein the electronic controller is further configured to generate one or more corresponding control signals for the digital signal processor using a tone-order sequence, the tone-order sequence having specified therein an order in which portions of the stream of values corresponding to different tones are to be handled by the digital signal processor.

16. The apparatus of claim 15, wherein the data receiver is configured to send a control message to a corresponding data transmitter, the control message having specified therein the two or more different index values and the tone-order sequence.

17. A communication method comprising:
configuring an electronic controller to:

interpret two or more different index values, each of the two or more different index values being assigned to a different respective set of tones configurable to carry data; and cause a shaping encoder and a constellation mapper to use, for each of the two or more different index values, a respective predefined pair of settings to generate constellation symbols encoded with the data for transmission on the different respective set of tones, the predefined pair including a respective predefined constellation and a respective predefined shaping code; and configuring a digital signal processor to drive an analog front end to cause a modulated electrical signal generated by the analog front end to carry the constellation symbols, the digital signal processor including the shaping encoder and the constellation mapper.

18. An apparatus comprising a data transmitter that comprises an electrical analog front end, a digital signal processor, and an electronic controller, wherein the digital signal processor is configured to run a plurality of shaping codes, each of the shaping codes being configured to generate amplitudes of constellation symbols of a respective constellation, the constellation symbols having source bits encoded therein;

wherein the electronic controller is configured to cause the digital signal processor to run each of the shaping codes as a block code, each of the block codes being configured to convert a respective block of the source bits into a respective block of amplitudes, the respective block of amplitudes having a respective fixed number of the amplitudes of the constellation symbols;

wherein the respective fixed number of the amplitudes is selected to be an integer multiple of a respective number of tones in a respective set of tones modulated using the respective constellation;

wherein a sum of the respective numbers of tones is equal to a number of tones configured to carry the source bits in one discrete multi-tone (DWT) symbol that includes said respective sets of tones; and wherein the digital signal processor is configured to drive the analog front end to cause a modulated electrical signal generated by the analog front end to carry the constellation symbols.

19. The apparatus of claim 18, wherein the sum of the respective fixed numbers of amplitudes is equal to a number of amplitudes configured to carry the source bits in exactly one DMT symbol.

20. The apparatus of claim 18, wherein the respective block of the source bits has a respective number of bits, the respective number of bits being capable to vary from one run to another run of the block code.

21. The apparatus of claim 20, wherein the digital signal processor is configured to implement a shaping code of the plurality using a first look-up table and a second look-up table, the first look-up table representing a code according to which some amplitudes have different respective probabilities of occurrence, and the second look-up table representing a code according to which different amplitudes have a same constant probability of occurrence; and wherein the electronic controller is configured to cause the digital signal processor to switch between using the first look-up table and using the second look-up table based on an evaluation of one or more metrics of blocks that are being processed with the plurality of shaping codes.

22. The apparatus of claim 21,
wherein the digital signal processor is further configured to implement the shaping code of the plurality using a default-value generator, the default-value generator being configured to output dummy amplitudes that do not encode any of the source bits; and
wherein the electronic controller is further configured to cause the digital signal processor to switch between using the first look-up table, using the second look-up table, and using the default-value generator based on the evaluation of the one or more metrics of the blocks that are being processed with the plurality of shaping codes.

23. The apparatus of claim 20, wherein the data transmitter is configured to:
count a respective total number of the source bits encoded in each particular DMT symbol; and
communicate the respective total numbers of the source bits to a corresponding data receiver.

24. The apparatus of claim 18, wherein the data transmitter is a part of a modem or is a part of a service distribution unit.

25. An apparatus comprising a data receiver that comprises an electrical analog front end, a digital signal processor, and an electronic controller,
wherein the digital signal processor is configured to:
process a stream of values representing an electrical signal outputted by the electrical analogue front end in response to a received frequency-division-multiplexed input signal; and
run a plurality of shaping codes, each of the shaping codes being configured to handle amplitudes of constellation symbols of a respective constellation, the constellation symbols having source bits encoded therein;
wherein the electronic controller is configured to cause the digital signal processor to run each of the shaping codes as a block code, each of the block codes being configured to convert a respective block of the amplitudes into a respective block of the source bits, the respective block of the amplitudes having a respective fixed number of amplitudes;
wherein the respective fixed number of the amplitudes is an integer multiple of a respective number of tones in a respective set of tones modulated using the respective constellation;
wherein a sum of the respective numbers of tones is equal to a number of tones configured to carry the source bits in one discrete multi-tone (DMT) symbol that includes said respective sets of tones; and
wherein the digital signal processor is configured to process the stream of values to recover the source bits encoded in the constellation symbols.

26. A communication method comprising:
configuring a digital signal processor to run a plurality of shaping codes, each of the shaping codes being configured to handle amplitudes of constellation symbols of a respective constellation, the constellation symbols having source bits encoded therein; and
configuring an electronic controller to cause the digital signal processor to run each of the shaping codes as a block code, each of the block codes being configured to interconvert a respective block of the source bits and a respective block of amplitudes, the respective block of amplitudes having a respective fixed number of the amplitudes of the constellation symbols;
wherein the respective fixed number of the amplitudes is selected to be an integer multiple of a respective number of tones in a respective set of tones modulated using the respective constellation; and
wherein a sum of the respective numbers of tones is equal to a number of tones configured to carry the source bits in one discrete multi-tone (DWT) symbol that includes said respective sets of tones.

* * * * *